April 14, 1964   E. C. SHAVER   3,128,817
APPARATUS FOR FORMING THREADS ON PIPE ENDS
Filed Jan. 9, 1961   10 Sheets-Sheet 2
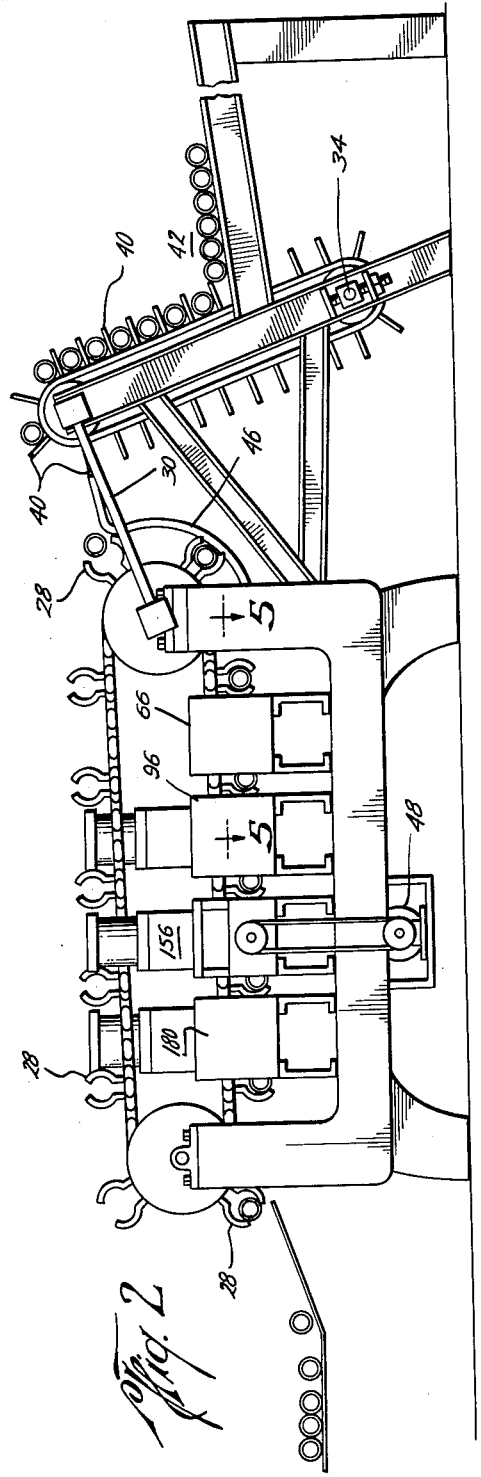
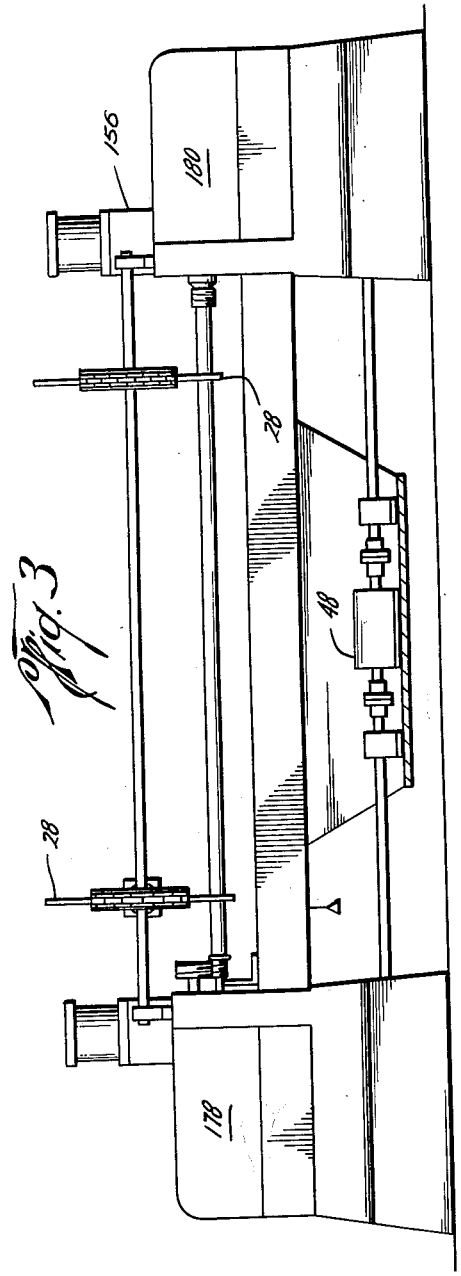
Elijah C. Shaver
INVENTOR.
BY *James M. Peppers*
AGENT

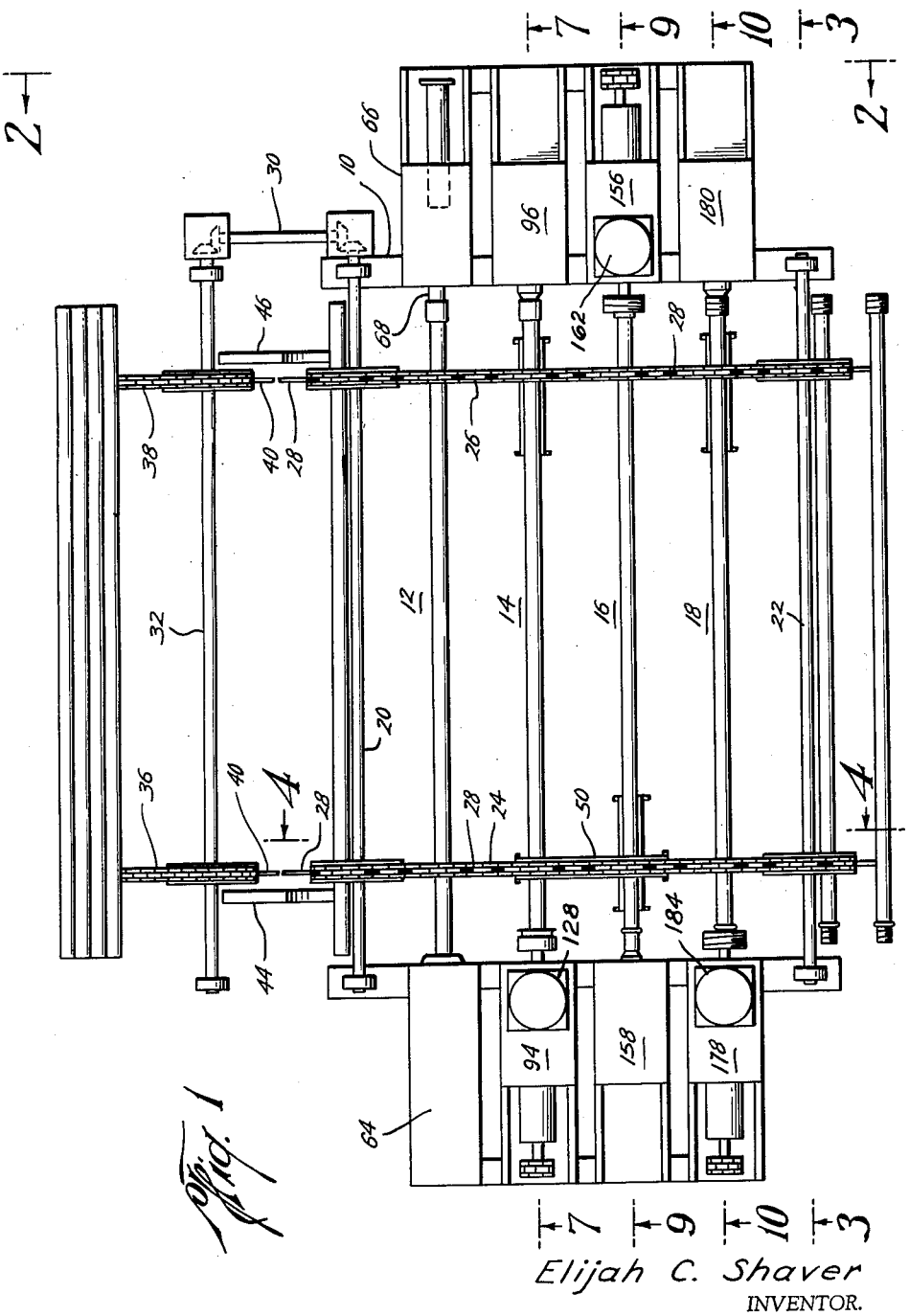

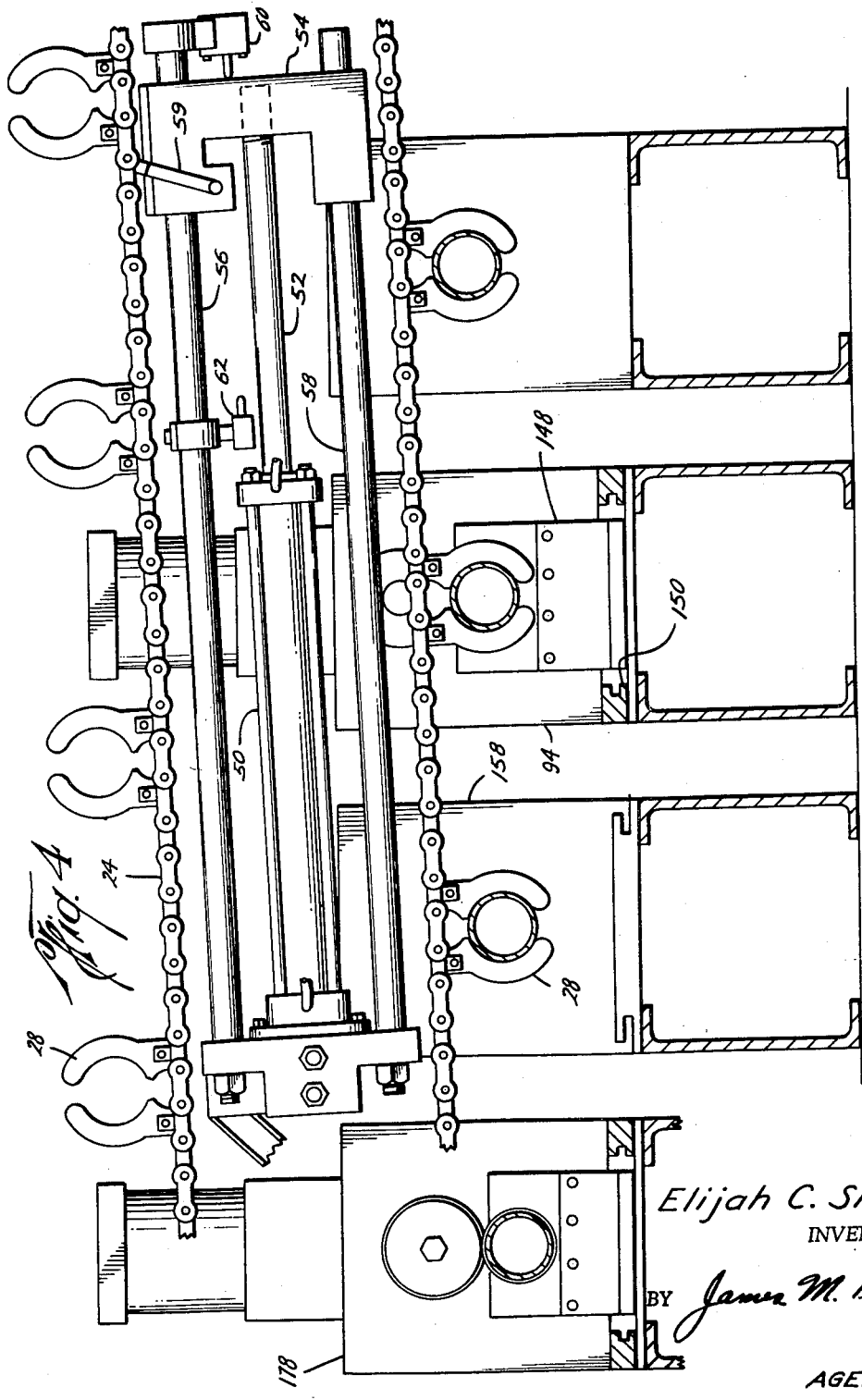

April 14, 1964 E. C. SHAVER 3,128,817
APPARATUS FOR FORMING THREADS ON PIPE ENDS
Filed Jan. 9, 1961 10 Sheets-Sheet 4
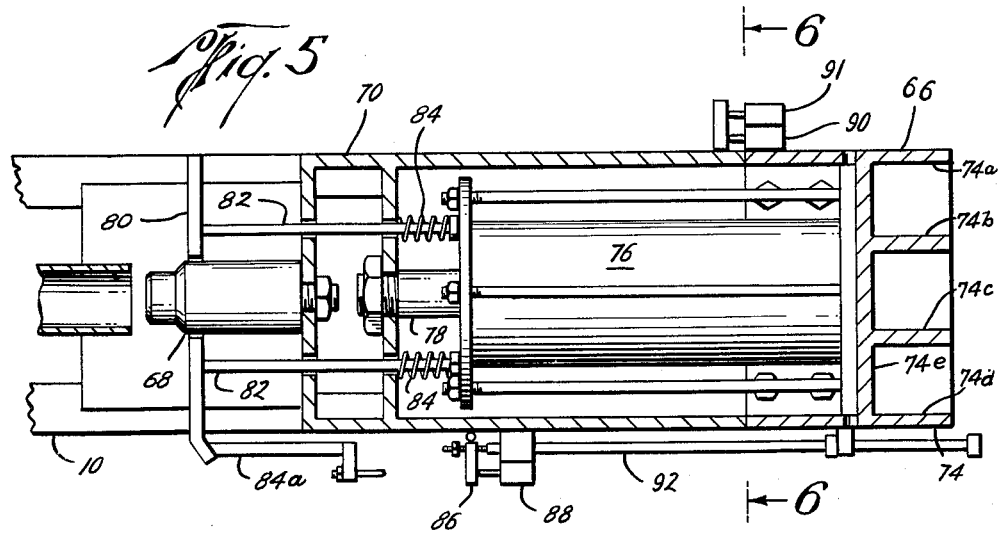
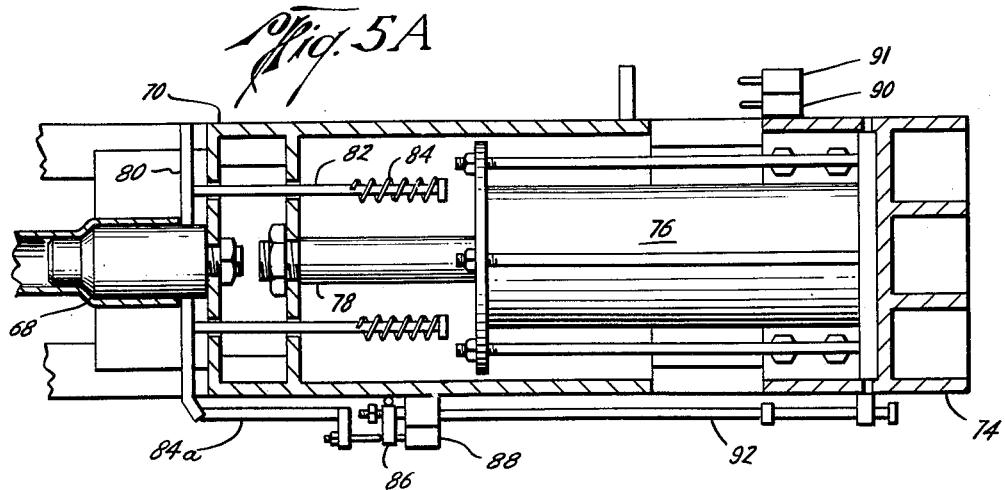
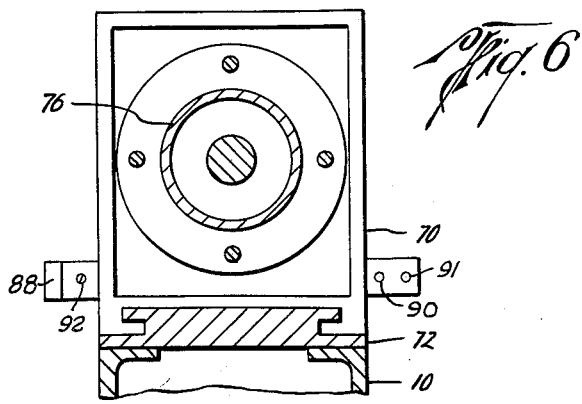
Elijah C. Shaver
INVENTOR.
BY James M. Peppers
AGENT

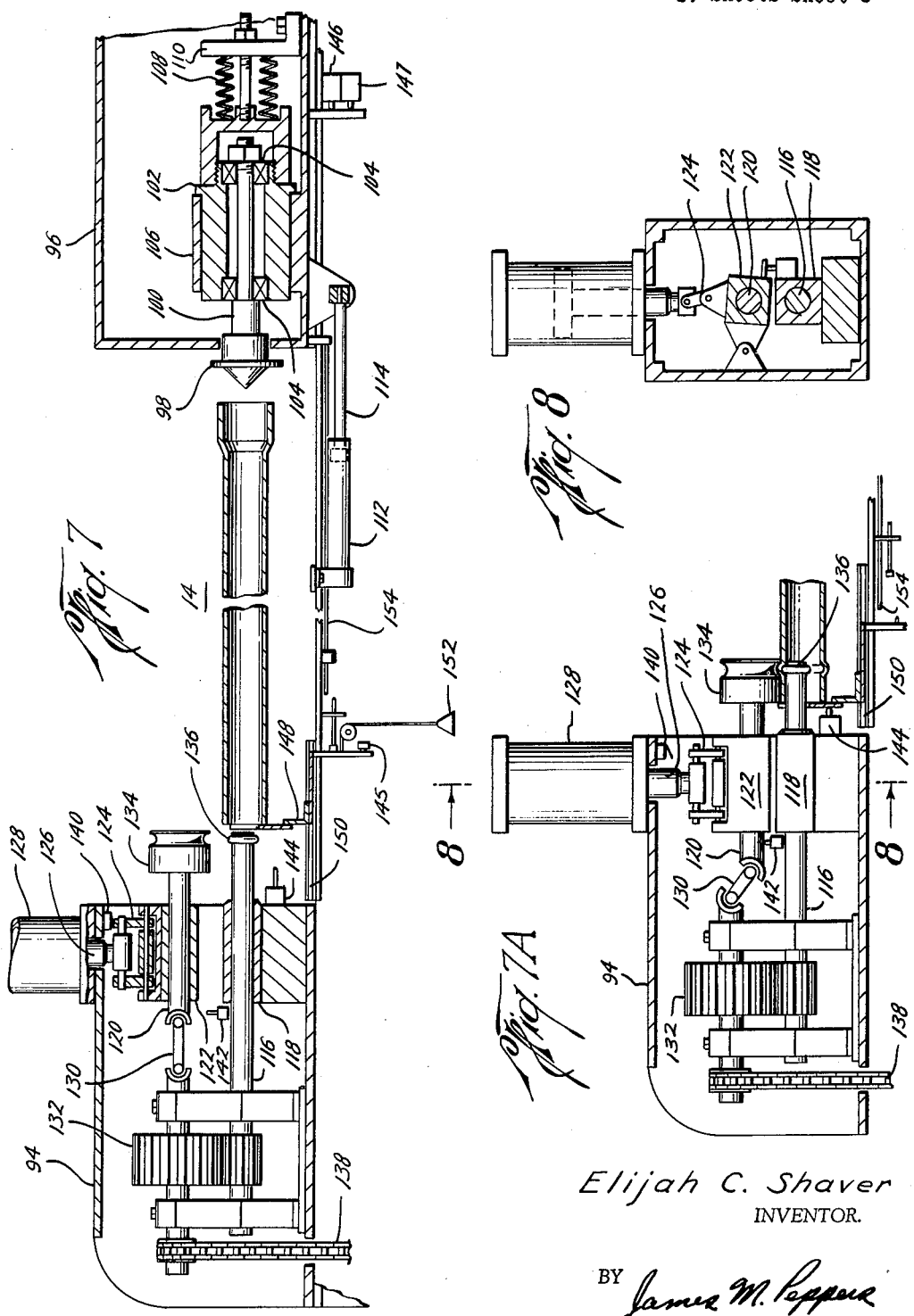

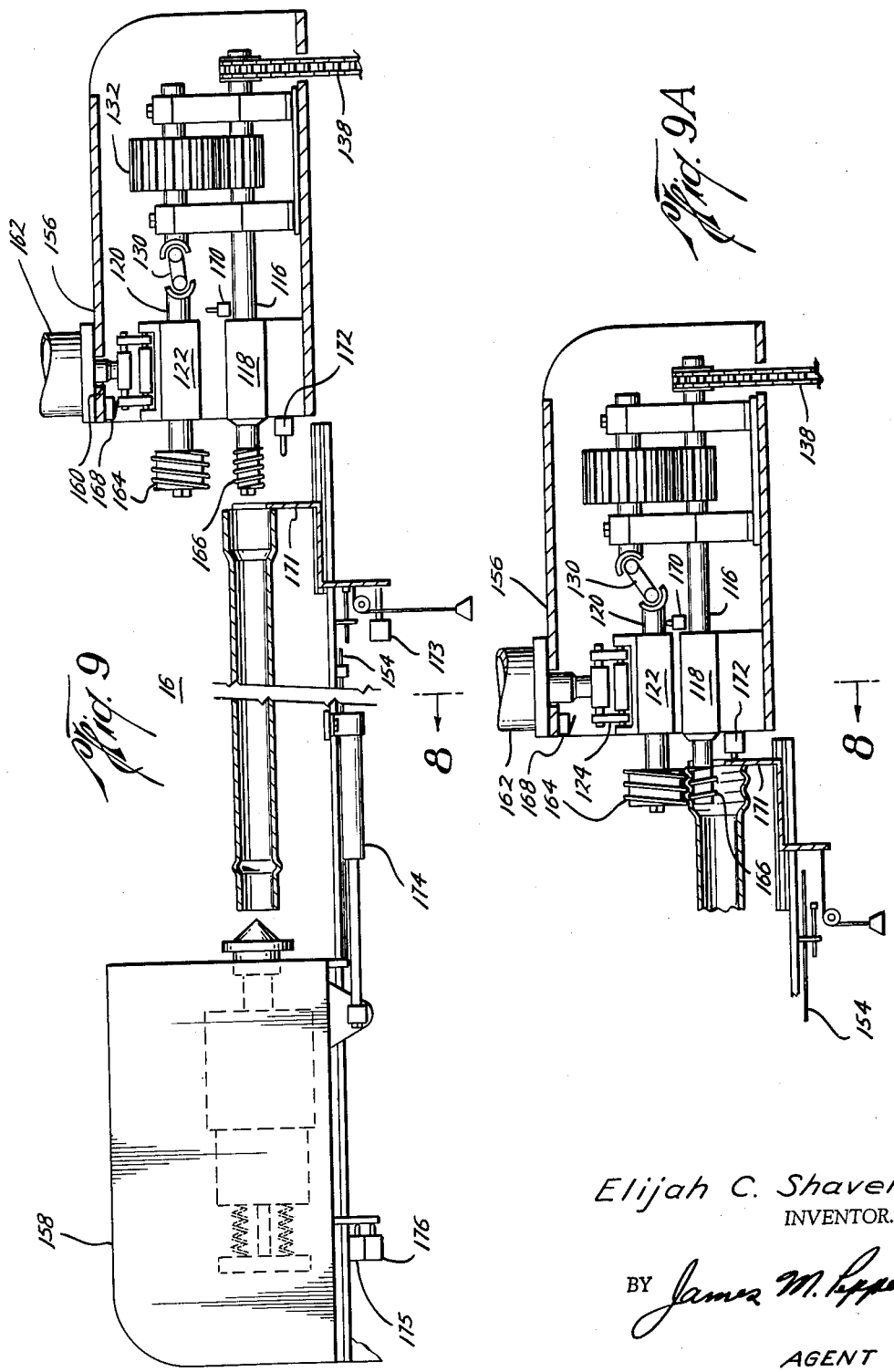

April 14, 1964
E. C. SHAVER
3,128,817
APPARATUS FOR FORMING THREADS ON PIPE ENDS
Filed Jan. 9, 1961
10 Sheets-Sheet 7
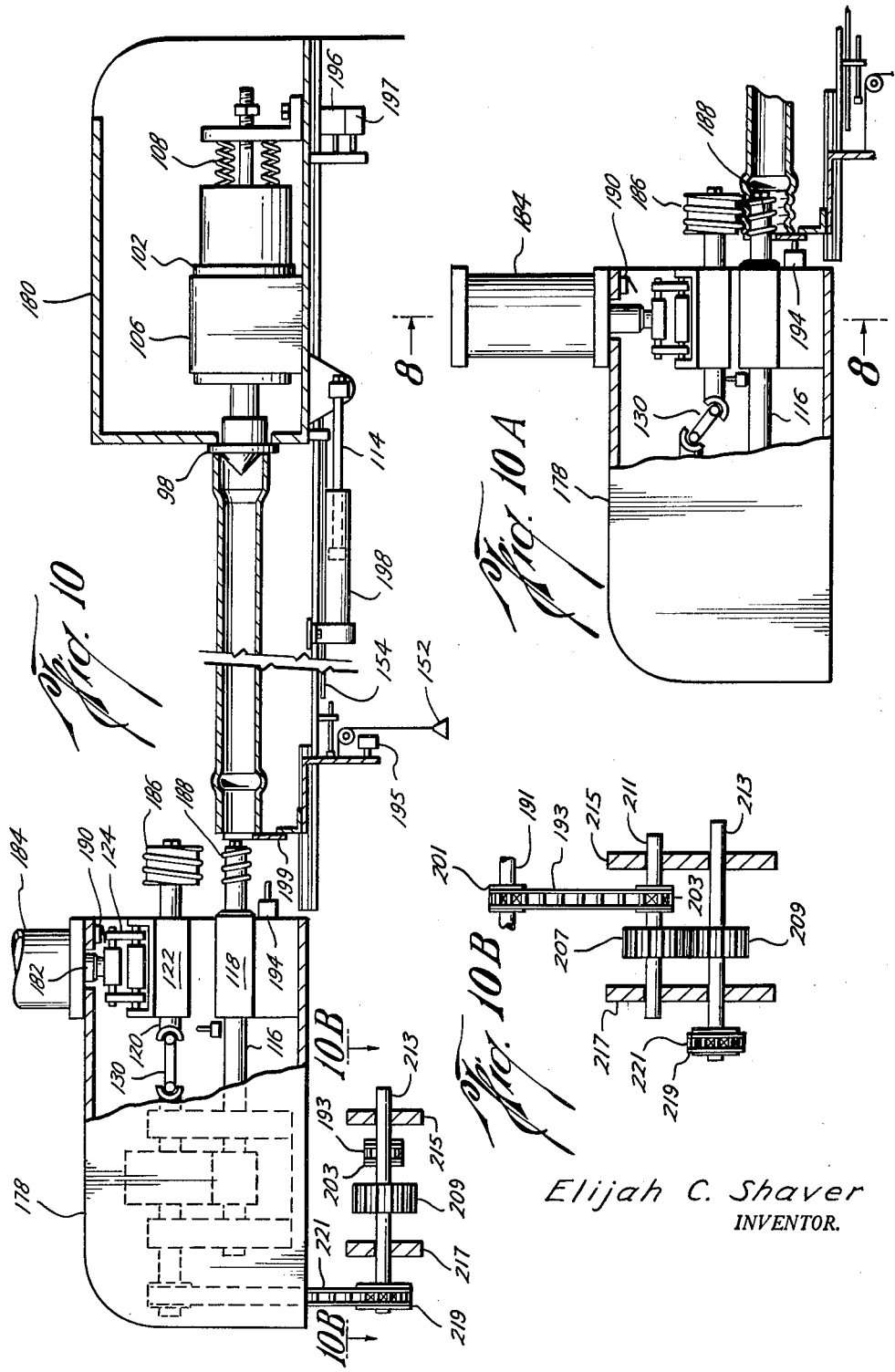
Elijah C. Shaver
INVENTOR.

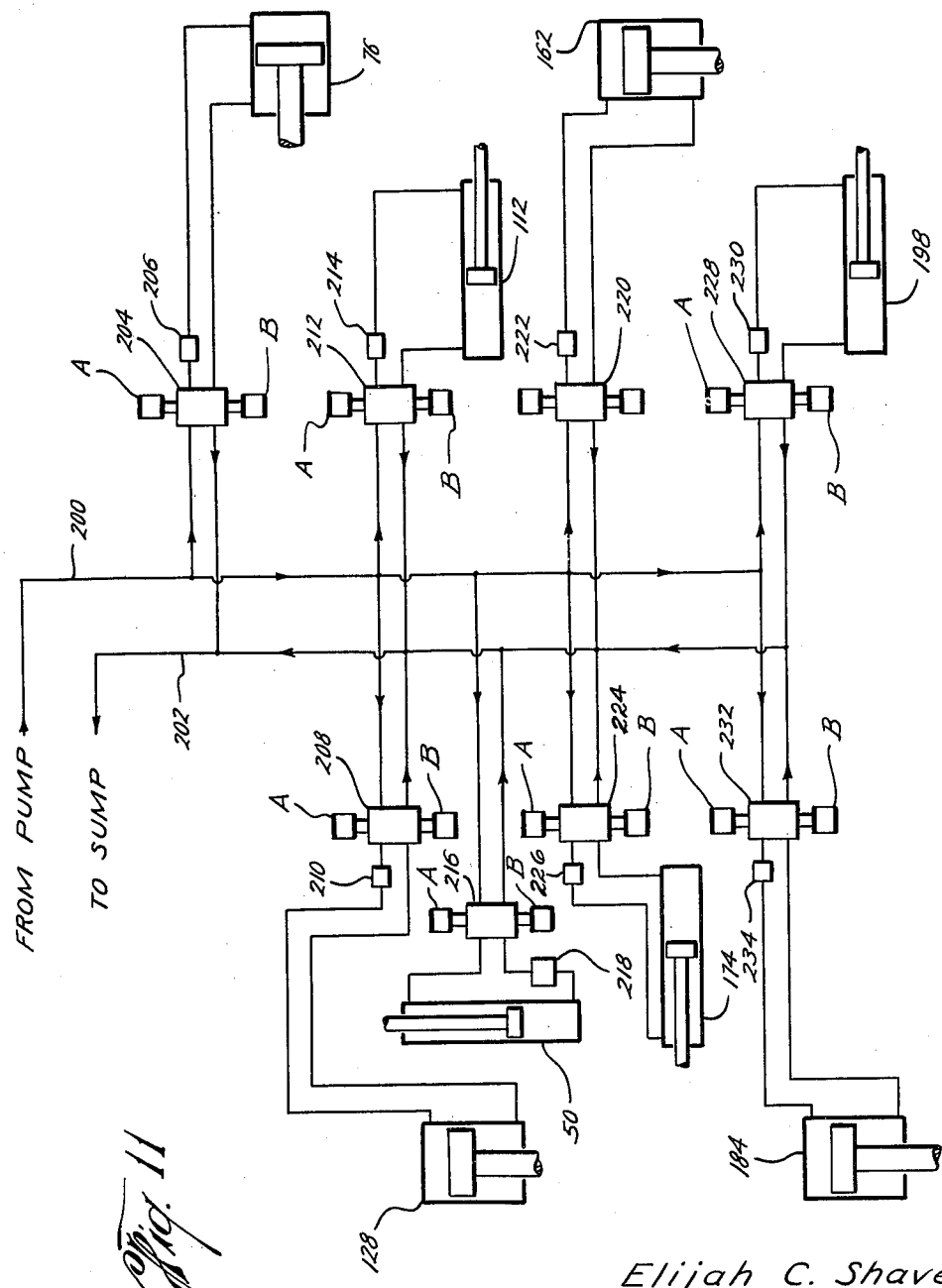

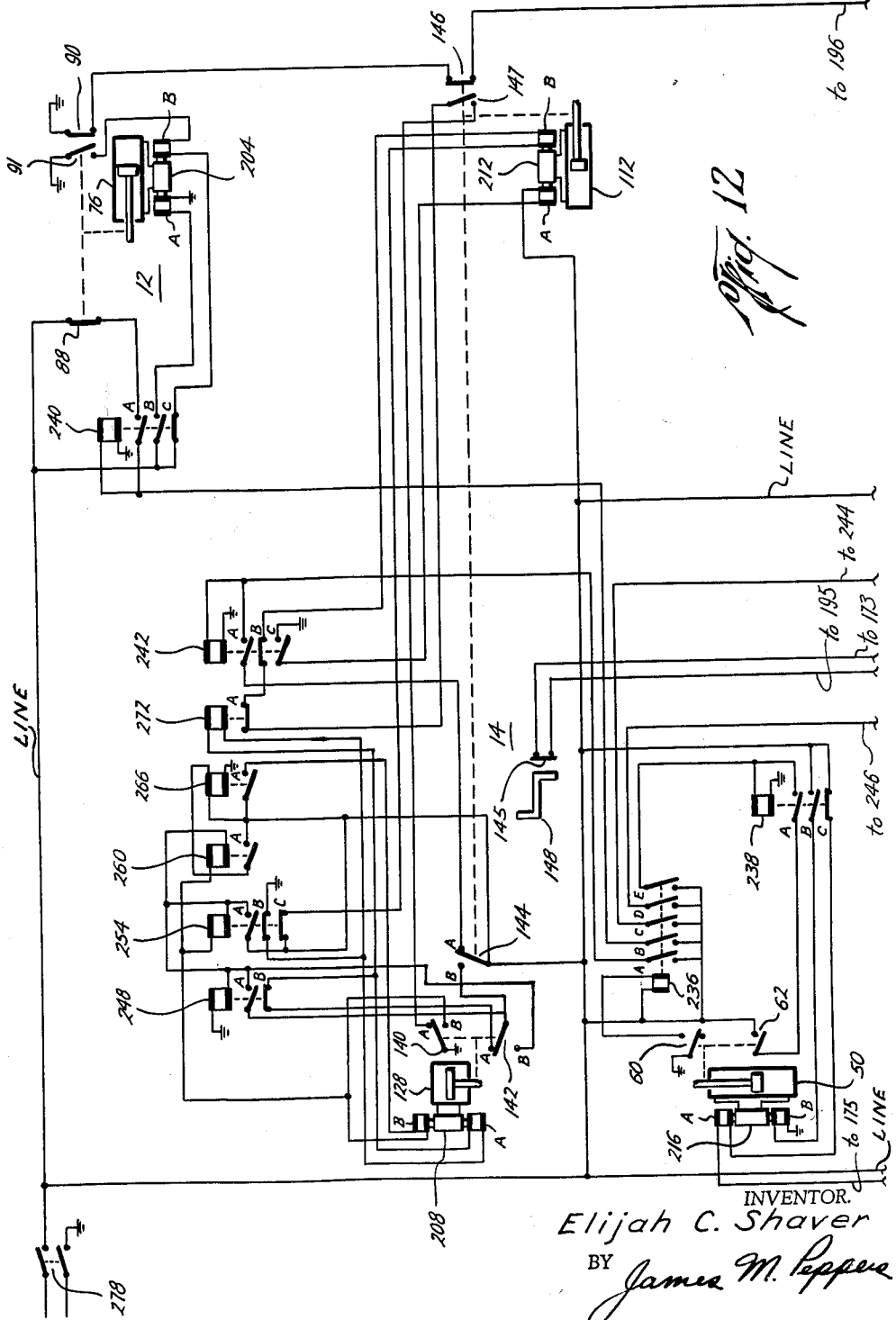

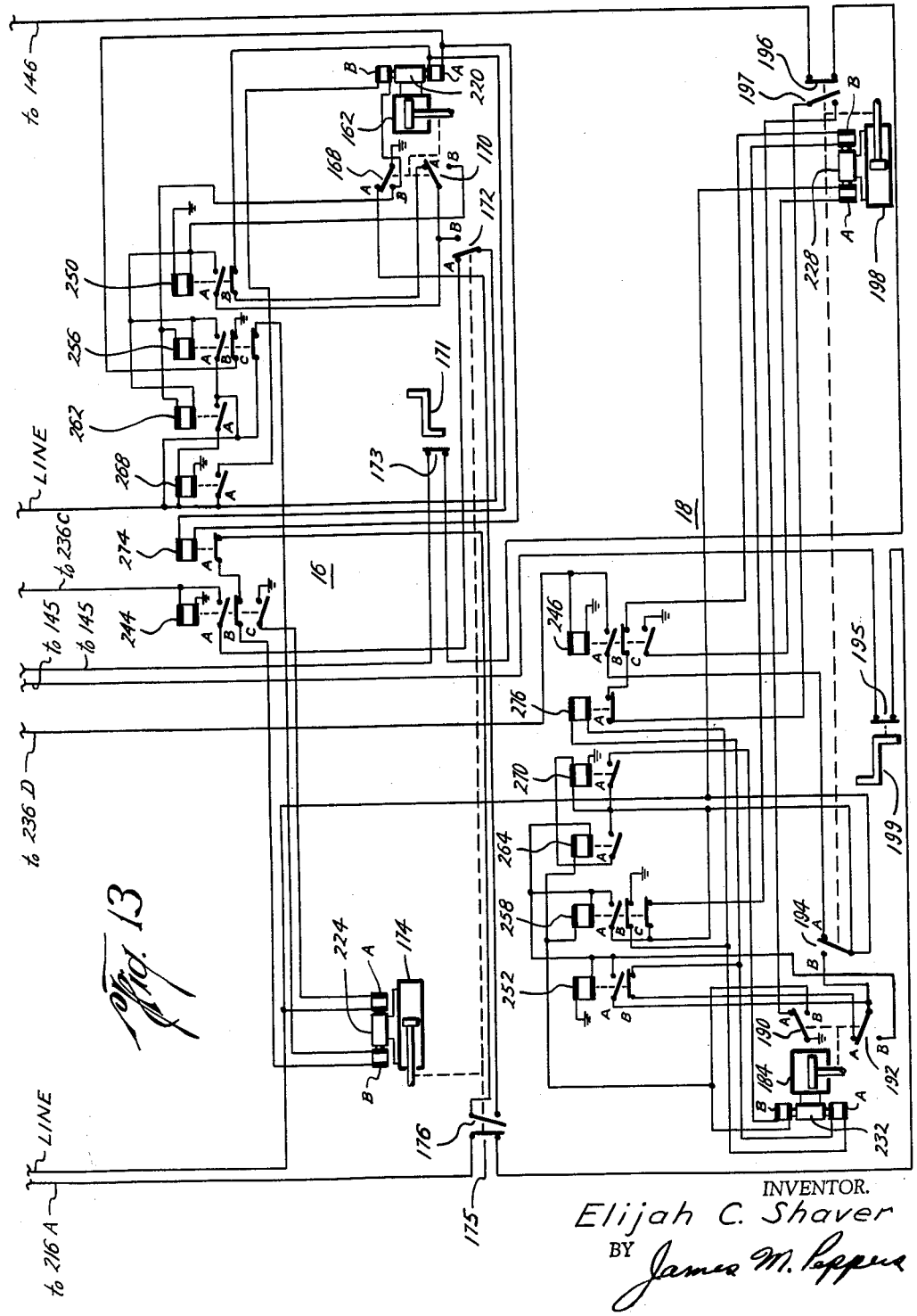

United States Patent Office 3,128,817
Patented Apr. 14, 1964

3,128,817
APPARATUS FOR FORMING THREADS
ON PIPE ENDS
Elijah C. Shaver, Houston, Tex., assignor to Brown &
Root, Inc., Houston, Tex., a corporation of Texas
Filed Jan. 9, 1961, Ser. No. 81,395
23 Claims. (Cl. 153—2)

This invention generally relates to apparatus for forming pipe and more particularly relates to apparatus for forming complementary engageable threads on opposite ends of shot hole casing or other thin wall ductile pipe.

This application is a continuation-in-part of patent application Serial Number 706,170 entitled "Apparatus for Forming Threads on Pipe Ends" filed December 30, 1957, by Elijah C. Shaver and now abandoned. Patent application Serial Number 706,170 is a continuation-in-part of patent application Serial Number 582,238 entitled "Pipe Threading Machine" filed May 2, 1956, by Elijah C. Shaver and now abandoned.

Joints of thin wall pipe having a male thread at one end and a female thread at the other are inserted into earth borings in joined relation to provide ready and repeated insertion of explosives used in seismic survey. Such explosives create seismic impulses to various strata beneath the earth's surface for subsequent reflection and detection. The pipe is subsequently pulled from the bore and the undamaged portions reused. Since such pipe is to some extent expendable, it is desirable to have such pipe manufactured at minimum cost and yet provide each joint with threaded connections which may be assembled in repeated and reliable fashion.

Machines for rolling coupling threads into ductile pipe have been previously devised. However, such machines are operated either manually or semi-manually with the attendant low volume output inherent in manual operation. The greater personnel required and the low volume output of such machines must necessarily be reflected in increased cost of the threaded pipe.

It is therefore the general objects of this invention to provide pipe threading apparatus which will perform the necessary forming operations at either end of such pipe to produce, in automatic fashion, well formed complementary sections of a threaded coupling.

Another object of the invention is to provide a machine in which the pipes to be threaded may be placed in and removed from the machine in large loads.

Another object of the invention is to provide apparatus in which the pipes are transported from one forming stage to the next in positive manner.

Another object of the invention is to provide a machine which will continue to operate though one or more forming stages have no pipes introduced therein which to form.

A further object of the invention is to provide a machine featuring a control means which prevents further transfer of the pipes from one forming stage to another until each forming stage has performed its respective forming operation and returned to rest.

Briefly described, such objects are attained by apparatus comprising: a frame, a plurality of pipe forming stages, each adapted to a pipe axially aligned within the stage, disposed on the frame in axial and transverse alignment. The stages include a pipe upsetting stage having a pipe supporting head and a pipe upsetting head, and a means to engage the head and a pipe received into the upsetting stage into upsetting relation and disengage the pipe and head to a rest position. An electrical control means controls the cycle of engagement, upsetting operation, and disengagement of the upsetting stage with the pipe and prepares the upsetting stage for a successive upsetting cycle. A linkage means causes completion of the upsetting cycle with no pipe received in the upsetting stage. A bead rolling stage is included having a beading head and resilient positioning head, said beading head having a first beading die mounted on a shaft supported by a fixed bearing, a second beading die mounted on a shaft supported by a bearing in axially parallel moveable relation to the first beading die, and transmission means adapted to rotate the beading dies at like peripheral speeds. A positioning means longitudinally positions the wall of a pipe received in the bead rolling stage and the beading dies into a beading position and returns the pipe and the beading dies to a rest position. An engagement means brings the beading dies into bead forming engagement with the wall of the pipe and returns the beading dies to a rest position. The electrical control means causes a cycle of positioning the pipe longitudinally, bringing the beading dies into bead forming engagement, holding the beading dies in bead forming engagement for a preselected period, returning the beading dies to rest position, returning the pipe to rest position, and preparing the bead rolling stage for a successive beading cycle. A linkage means causes completion of the beading cycle with no pipe received in the bead rolling stage. A female thread rolling stage is included having a threading head and a resilient positioning head, said threading head having a first threading die mounted on a shaft having a fixed bearing, a second threading die mounted on a shaft supported by a bearing in axially parallel moveable relation to the first threading die, and transmission means adapted to rotate the threading dies at like peripheral speeds. A positioning means longitudinally positions the wall of a pipe received in the female thread rolling stage and the threading dies into a thread rolling position and returns the pipe and the threading dies to a rest position. An engagement means brings the threading dies into thread forming engagement with the wall of the pipe and returns the threading dies to a rest position. The electrical control means causes a cycle of positioning the pipe longitudinally, bringing the threading dies into thread forming engagement, holding the threading dies in thread forming engagement for a preselected period, returning the threading dies to rest position, returning the pipe to rest position, and preparing the female thread rolling stage for a successive rolling cycle. A linkage means causes completion of the threading cycle with no pipe received in the female thread rolling stage. A male thread rolling stage is included having a thread rolling head and resilient positioning head, said threading head having a first threading die mounted on a shaft supported by fixed bearing and a second threading die mounted on a shaft supported by a bearing in axially parallel moveable relation to the first threading die, and transmission means adapted to rotate the threading dies at like peripheral speeds. The male thread rolling stage provides faster rotation of the pipe during thread rolling than the female thread rolling stage. A positioning means longitudinally positions the wall of a pipe received in the thread rolling stage into a threading position adjacent the bead formed by the beading stage and returns the pipe and the threading dies to a rest position. An engagement means brings the threading dies into thread forming engagement with the wall of the pipe and returns the threading dies to a rest position. The electrical control means causes a cycle of positioning the pipe longitudinally, bringing the threading dies into threading engagement, holding the threading dies in threading engagement for a pre-selected period, returning the threading dies to rest position, longitudinally returning the pipe to a rest position, and preparing the male thread rolling stage for a successive rolling cycle. A linkage means causes completion of the threading cycle with no pipe received in the male thread rolling stage. A pipe transfer means is included having a moveable conveyor means tautly disposed on the frame in transverse relation to the axes of the pipe forming stages. Pipe supporting tongs are disposed on the conveyor means in alignment to the axis of the forming stages. Each of said tongs are adapted to diverge at the outer ends of the frame into pipe receiving and ejecting relation and to converge between the ends into pipe supporting relation. An actuator means moves the conveyor means the distance from the axis of one forming stage to the next. The electrical control means causes the conveyor means to move each time the forming stages have all completed their forming cycles and retracted to rest position.

Other objects and advantages of the invention will become more apparent from reference to the following specific description taken with the accompanying drawing in which:

FIGURE 1 is a plan view of the machine.

FIGURE 2 is a side elevation of the machine with the pipes entering at the right and exiting at the left.

FIGURE 3, taken at 3—3 of FIGURE 1, is a front elevation of the machine.

FIGURE 4, taken at 4—4 of FIGURE 1, is a partially sectional elevation of the pipe transfer means and forming stages.

FIGURE 5, taken at 5—5 of FIGURE 2, is a plan sectional view of the pipe upsetting stage.

FIGURE 5A is the section of FIGURE 5 at a different sequence of operation.

FIGURE 6 is a vertical section taken at 6—6 of FIGURE 5.

FIGURE 7, taken at 7—7 of FIGURE 1, is a longitudinal vertical section of a pipe bead forming stage of the machine.

FIGURE 7A is a partial section of FIGURE 7 taken at a different sequence of operation.

FIGURE 8 is a transverse vertical section taken at 8—8 of FIGURES 7A, 9A and 10A.

FIGURE 9, taken at 9—9 of FIGURE 1, is a longitudinal vertical section of a female threading stage of the machine.

FIGURE 9A is a partial section of FIGURE 9 taken at a different sequence of operation.

FIGURE 10, taken at 10—10 of FIGURE 1, is a longitudinal vertical section of a male threading stage of the machine.

FIGURE 10A is a partial section of FIGURE 10 taken at a different sequence of operation.

FIGURE 10B is a plan view taken at lines 10—10 of FIGURE 10.

FIGURE 11 is a schematic circuit of the hydraulic actuation elements of the machine.

FIGURES 12 and 13 are a schematic electrical circuit of the control system to which the machine is responsive.

First, referring to FIGURE 1 in view of FIGURES 2, 3 and 4, a machine framework 10 supports a pipe upsetting stage 12, a pipe beading stage 14, a female threading stage 16, and a male threading stage 18 adjacently disposed with axes parallel and in transverse alignment.

A pipe transfer carriage sprocket shaft 20 is supported on frame 10 in adjacent alignment with upsetting stage 12. A pipe transfer carriage sprocket shaft 22 is supported in adjacent alignment with male threading stage 18 on frame 10. Pipe transfer chain and sprocket assemblies 24 and 26 are assembled in taut relation between shafts 20 and 22 near either end of the shafts.

Attached to chain assemblies 24 and 26 at spacings equal to the axes spacings of the pipe forming stages are complementary halves of pipe gripping tongs 28. As shown in FIGURES 2 and 4, each half of tongs 28 is rigidly connected to alternate links of the chain in a manner permitting divergence of the tongs as the chains pass over the sprockets and convergence of the tongs into pipe supporting relation when the chain is disposed taut and straight.

Shaft 20 is connected through a rotation transfer means 30 to an upper shaft 32 of a pipe lifting carriage supported from the framework 10. A lower shaft 34 is supported within frame 10 in axial alignment with shaft 32. Chain and sprocket assemblies 36 and 38 are assembled in taut relation between shafts 30 and 32 at spacings corresponding with chain and sprocket assemblies 24 and 26. A plurality of fingers 40 are attached to the chains 36 and 38 in a manner permitting extension of each finger normal to the chain.

The spacing between the fingers 40 on the chains 36 and 38 is slightly greater than the diameter of the pipes. The chains 36 and 38 are inclined from the vertical toward the pipe forming stages. A portion of frame 10 provides a rack inclined downwardly into intersection with the chains 36 and 38. The chains and rack thus form a hopper-like arrangement 42 to the bottom of which the pipe will roll to be picked up by the fingers 40 upon rotation of sprocket assemblies 36 and 38. Thus, when the pipe lifting carriage shaft 32 is rotated, pipes are picked up by corresponding fingers 40 on each of the chains, then lifted up and over shaft 32 to roll away as the fingers become downwardly inclined.

The pipes thereon roll from the fingers 40 down an incline guideway formed by inclined guide members 44 and 46. The guide members project from the frame 10 about the outer travel periphery radius of the pipe located in the tongs 28, then extend from such travel radius to the fingers 40. When provided as shown, the pipe guide members provide a guideway from the fingers into the diverged tongs 28 and retain the pipe within the tongs 28 until the tongs have converged upon passing the sprocket. The tongs then retain the pipe in a firm grip for successive transfer to each forming stage. As the tongs 28 move the pipes past stage 18 the chains pass over the sprockets of shaft 22, causing the tongs to diverge and eject the pipes onto exitways from the machine.

Shown supported beneath the frame 10 is a power unit 48 which may include a motor and such reduction gears as necessary to provide power at proper rotational speed to rolling dies of stages 14, 16 and 18. As shown such power is transferred through drive shafts beneath each rolling stage and through chain drives to each stage. Portions of the power transfer unit appear in FIGURES 1, 2 and 3. It is pointed out that power could be supplied to rolling stages 14, 16 and 18 by other means than herein illustrated such as gear transfer, individual electric motors, multiple belt drives and the like.

It is also pointed out that the rotation transfer means 30 between transfer carriage shaft 22 and lifting carriage shaft 32 may be a chain drive or other suitable means for effecting synchronous movement between the carriages.

As best seen in FIGURES 1 and 4, the pipe transfer carriage is moved in successive increments by a hydraulic piston and cylinder actuator 50, bracketed within the chain assembly 24 from the frame 10. Actuator 50 is adapted to extend or withdraw a piston rod 52 in response to application of hydraulic pressure at either end of its cylinder. Piston rod 52 is connected into a crosshead 54 which is adapted to reciprocate along guide rods 56 and 58. A traverse pawl 59, connected to crosshead 54, is adapted to engage and move the chain upon extension of the piston rod 52 and disengage from the chain in ratchet fashion upon retraction of the rod 52.

Extension of piston rod 52 actuator is halted and retraction of the rod is initiated by actuation of a switch 60 adapted for engagement with crosshead 54 upon preselected extension of rod 52. Retraction of piston rod 52 is halted by actuation of a switch 62, which engages crosshead 54 upon withdrawal of piston rod 52 to a preselected position. The positions of switches 60 and 62 are adjusted to provide movement of the pipe transfer carriage assembly a definite predetermined increment upon each extension and retraction of the piston rod 52. Thus, upon each cycle of actuator 50, the pipe transfer carriage moves the pipe the exact distance from the center of one forming stage to the next and supplies one additional pipe from the lifting carriage assembly into a successive pipe gripping tong 28.

Hydraulic flow into and from the actuator 50 is controlled by solenoid valves responsive to switches 60 and 62, later described.

The pipe upsetting stage 12 shown in FIGURES 1 and 2 includes a fixed pipe supporting head 64 connected to cross-members of frame 10 in position to support a pipe positioned in tongs 28 against longitudinal movement. Fixed at the other end of the crossmembers of frame 10 is a pipe upsetting head assembly 66 positioned to permit extension of a pipe upsetting die 68 into the end of the pipe.

FIGURES 5, 5A and 6 illustrate upsetting head assembly 66 in greater detail. As shown in FIGURES 5 and 6, upsetting die 68 is connected to the forward face of a moveable ram 70. Ram 70 is adapted to extend and retract in interlocked relation along a bed 72 which is attached to cross-members of frame 10. Ram 70 retracts into abutment with a rigid supporting head 74 connected to bed 72. Fixed to head 74 and nested with ram 70 is a hydraulic piston and cylinder actuator 76 having an extendable and retractable piston rod 78 connected to an inner face of ram 70.

A stripping plate 80, adapted to pass over die 68, is connected to the front of ram 70 by plurality of push rods 82, each connected into ram 70 in limited reciprocative relation. Pushrods 82 are adapted to engage the forward head of actuator 76 upon full retraction of ram 70 and extend stripper plate 80 from the front of ram 70 to near the end of die 68. As ram 70 is extended by actuator 76 the pushrods 82 lose abutting support and permit stripper plate 80 to retract over the die 68 as required by extension of the die 68 into the pipe.

Springs 84 are disposed on each pushrod 82 intermediate retainer lugs at the end of each rod and the inner face of the ram 70. The purpose of such springs is to permit stripper plate 80 to be positioned as previously described and yet provide limited resilient reciprocating relation between plate 80 and ram 70 upon full retraction of piston rod 78.

As shown in FIGURE 5A, extension of the die 68 into upsetting relation within the pipe urges stripper plate 80 over the die. Then, as ram 70 is retracted in response to actuator 76, the pushrods 82 abut the face of actuator 76, preventing further retraction of the stripper plate. As the ram 70 continues to retract, stripper plate 80 moves off die 68, stripping the pipe off the die.

It is seen that the distance that stripper plate 80 retracts over the die is indicative of the depth that the die has been forced into the pipe. Thus, a pushrod 84 connected to plate 80 and extending along the side of ram 70 is provided for engagement of an actuating lever 86 attached to the side of ram 70. Pushrod 84 has a threaded length adjustment near its end. Actuating lever 86 is adapted to actuate a switch 88 when engaged by pushrod 84. Pushrod 84 is brought into engagement with lever 86 by retraction of plate 88 over the die 68 responsive to insertion of the die within the pipe.

Upon extension of die 68 into the pipe at a predetermined distance, the pushrod 84 engages lever 86 and actuates switch 88. Switch 88 controls a solenoid valve, later described, which halts the extension of hydraulic actuator 76 and initiates retraction of the actuator. Ram 70 then retracts into engagement with a switch 91, halting movement of the actuator until a subsequent pipe is brought into position. Full retraction of ram 70 also actuates a switch 90 to indicate its return to rest position.

An adjustable link 92 is provided in connection between support head 74 and actuating lever 86 to provide actuation of switch 88 if the ram 70 and stripper plate 80 were to extend when no pipe is in position to be upset. It is seen, in such case, that the stripper plate 80 would not be deflected to cause the pushrod 84 to engage lever 86. However, by adjustment of link 92, the lever 86 will actuate switch 88 at a predetermined extension distance of ram 70 relative to head 74 and cause retraction of ram 70 for a subsequent cycle in the same manner as previously described when a pipe end has been upset.

In operation, the upsetting stage 12, in response to the later described electrical control system, performs the upsetting operation on each successive pipe transferred into position by the transfer carriage and then retracts to rest position until another pipe is transferred into position.

Now referring to FIGURES 1 and 7, the pipe beading stage 14 is seen to include a fixed pipe rolling head 94 supported on one end of crossmembers of frame 10 and a moveable positioning head 96 disposed at the other end of frame 10 crossmembers. Positioning head 96 is mounted in interlocked slideable relation with a bed which is attached to the crossmembers as is shown in FIGURE 6. Extending from the front of head 96 is a free-turning conical pipe positioning cone 98 attached to a spindle 100 extending into head 96. Spindle 100 extends into a sleeve 102 through bearings 104. Sleeve 102 is disposed in a housing 106 forming a portion of head 96. Axial movement of sleeve 102 within housing 106 is permitted in opposition to prestressed springs 108 disposed intermediate the sleeve and a support 110.

Positioning head 96 may be extended toward rolling head 94 and retracted to rest position by a hydraulic piston and cylinder actuator 112 connected to frame 10 crossmember and having a piston rod 114 connected to head 96. Flow of hydraulic fluid into the extension or retraction side of actuator 112 is controlled by a later described solenoid valve which is responsive to the electrical control system.

Rolling head 94 is provided with a lower roller shaft 116 extending through a fixed bearing 118 and an upper roller shaft 120 extending through a vertically movable bearing 122. As seen also in FIGURE 8, bearing 122 is attached to head 94 in pivoted relation to a piston rod 126 of a hydraulic actuator 128 through connecting links 124. Extension of piston rod 126 from actuator 128 lowers shaft 122 toward shaft 116.

Upper shaft 120 is connected through a universal joint assembly 130 into geared relation with lower shaft 116 by gears 132. Complementary bead rolling dies 134 and 136 are attached to the outer ends of shafts 120 and 116. Gear assembly 132 is provided of proper ratio to the respective diameters of rolling dies 134 and 136 to cause the dies to rotate at identical peripheral speed. Shafts 116 and 120 are rotated by a chain drive 138 from power source 48 as previously described.

When head 96, in response to actuator 112, extends forward, the pipe is axially displaced toward the head 94. The pipe engages a positioning plate 148, carrying the plate past lower rolling die 136 into engagement with a positioning switch 144. Actuation of switch 144 halts positioning head 96, positioning the pipe properly for the beading operation. Actuation of switch 144 concurrently causes descent of upper rolling die 134 into bead forming engagement with lower rolling die 136. Such engagement is illustrated in FIGURE 7A.

When rolling die 134 is lowered a switch 142 is actuated, initiating a dwelling cycle within the electrical control system which controls the engagement time of the dies. Upon termination of the dwell time, piston rod 126 is withdrawn, actuating a switch 140. Switch 140 halts upward travel of die 134 and initiates return of positioning head 96 and positioning plate 148, returning the pipe to position for subsequent transfer by the carriage.

Positioning plate 148 is provided to slide in tracks 150 provided on the crossmembers of frame 10 and is pulled away from head 94 by a weight 152 or equivalent means. Full retraction of plate 148 engages a switch 145 to indicate its return. Full retraction of positioning head 96 engages switches 146 and 147 for actuation. Actuation of switches 145 and 146 arms the control system for a subsequent beading operation. Actuation of switch 147 halts return movement of head 96.

The compressional strength of positioning sleeve springs 108 is selected relative to the weight of positioning plate retraction weight 152 to provide slight axial deflection of positioning cone 98 as the pipe is pushed into rolling position. The resulting shortening of the pipe during the beading operation, and the shortening and axial movement of the pipe attendant with the later described threading operations, is resolved into varied deflection of cone 98 and the pipe remains positively positioned during the entire rolling operation. Such feature has been found of particular value for the later described threading stages to insure repeated tracking of the threading dies in the developing pipe threads.

In the event that no pipe is in position to be beaded, a pushrod 154 is disposed between the positioning plate 150 and a projecting lug of positioning head 96 which transfers extension movement of head 96 to positioning plate 148. Rod 154 is provided somewhat shorter than the effective length of the pipe so that plate 148 may be positioned to initiate the operating sequence if a pipe is not present.

Referring to FIGURES 9 and 10 in view of FIGURES 7 and 8, attention is directed that the component elements of the rolling heads and positioning heads are identical and, for clarity and simplicity, are assigned identical numbers.

Referring to FIGURES 1 and 9, the female threading stage 16 is seen to include a thread rolling head 156 fixed to one end of frame 10 cross members and a moveable positioning head 158 attached to a fixed bed at the other end of frame 10 crossmembers. The rolling head is raised and lowered by piston rod 160 of a hydraulic actuator 162. Positioning head 158 is extended and retracted by hydraulic actuator 174. Connected to the shaft ends of rolling head 156 are an upper thread rolling die 164 and a lower thread rolling die 166.

Retraction of rolling die 164 engages an upper switch 168 for actuation. Extension of upper thread rolling die 164 into thread forming position engages a switch 170 for actuation. Extension of the pipe positioning plate 171 engages a positioning switch 172 for actuation. Retraction of the positioning head 158 into rest position engages switches 176 and 175 for actuation. Retraction of the positioning plate 171 engages a switch 173 for actuation. The female thread forming stage of FIGURE 9, in response to these switches, is controlled by the later described electrical control system in the same manner as the bead rolling stage 14.

FIGURE 9A illustrates a pipe positioned in thread rolling head 156 with the thread rolling die 164 lowered into thread forming engagement with die 166.

Male pipe threading stage 18 is seen, in FIGURES 1 and 10, to include a fixed thread rolling head 178 at one end of crossmembers 10 and a moveable positioning head 180 positioned at the other end of the crossmembers. An upper thread rolling die 186 is extended into and retracted from thread forming engagement with a lower thread rolling die 188 by extension of a piston rod 182 from an actuator 184. Extension of piston rod 182 engages a switch 192 for actuation. Retraction of piston rod 182 engages a switch 190 for actuation. Extension of positioning plate 199 past lower rolling die 188 engages a switch 194 for actuation. Retraction of positioning plate 199 engages a switch 195 for actuation. Retraction of positioning head 180 to a rest position engages switches 196 and 197 for actuation. Stage 18 operates in response to these switches as previously described for stages 14 and 16.

As shown in FIGURES 10 and 10B power is provided to thread rolling head 178 from power source 43 shown in FIGURES 2 and 3 through shaft 191 having a sprocket 201 coupled thereto. Chain 193 couples shaft 191 to sprocket 203 which is connected to shaft 211, which also has coupled thereto gear 207. Shaft 211 and shaft 213 are supported by members 215 and 217. Shaft 213 has a gear 209 which may have fewer teeth than gear 207 thereby providing a difference in the speed of rotation of shaft 213 from the speed of rotation of shaft 211. Also coupled to shaft 213 is sprocket 219 which is in engagement with chain 221. Chain 221 is coupled to thread rolling head 178 to provide rotation of dies 186 and 188.

It may be noted that the direction of rotation of the pipe at the male thread rolling stage is opposite to the direction of rotation of the pipe at the female thread rolling stage and the rotational speed of the pipe at the male thread rolling stage is faster than the rotational speed of the pipe at the female thread rolling stage. Such faster rotational speed of the pipe at the male thread rolling stage is desirable for most effective operation of the apparatus due to the smaller diameter of the pipe at the end having the male threads as compared to the diameter of the pipe having the female threads. In orther words, assuming there is an optimum linear or peripheral speed, the angular velocities or r.p.m. of the pipe is different for different diameters of pipe. The male threaded end has a smaller diameter and consequently a faster angular velocity or more revolutions per minute is provided at the male thread rolling stage than at the female thread rolling stage. At both the female and male thread rolling stages, slight axial movement occurs in a direction away from the dies. Axial movement occurs due to slippage of the pipe as it is rotated between the dies. Thus, axial movement of the pipe at the male and female thread rolling stage is away from the dies toward the movable positioning head.

The hydraulic system to power the various actuators is illustrated in FIGURE 11. A high pressure manifold 200 is connected to a hydraulic pump (not shown). A low pressure manifold 202 is connected to a return sump (not shown) from which the pump is supplied. Upsetting ram actuator 76 is supplied from manifold 200 through a four-way solenoid valve 204 and a variable flow-control valve 206. Energization of solenoid 204A permits fluid flow from manifold 200 into the extension side of actuator 76 and flow from the exhaust side of actuator 76 to exhaust manifold 202, causing the actuator to extend into upsetting position. Energization of solenoid 204B exhausts the extension side of actuator 76 to exhaust manifold 202 and permits hydraulic flow into the retraction side of the actuator from the supply manifold. Solenoid valve 204, as are the remaining valves to be described, is of spring loaded self-centering type which prevents flow to and/or from actuator 76 with both solenoids 206 and 206B de-energized.

The purpose of variable valve 206 is to provide a selected rate of extension for ram 76 commensurate with the mass of the ram and the material of the pipe being upset. No restriction is provided in the retraction cycle since rapid withdrawal to a rest position is desired.

Actuator 112 of the bead rolling positioner 96 is connected to manifold 200 through a solenoid valve 212 and a variable valve 214, and to exhaust manifold 202 through the solenoid. Energization of solenoid 212A permits flow of hydraulic fluid into the extension side of actuator 112, causing extension of positioner 96. Energization of solenoid 212 B exhausts the extension side and permits fluid flow into the retraction side of actuator 112 causing positioner 96 to retract. Variable valve 214 permits control of actuator 112 as previously described for actuator 76.

Bead rolling actuator 128 is supplied from manifold 200 through a solenoid valve 208 and a variable valve 210 and exhausted to manifold 202 through solenoid valve 208. Energization of solenoid 208A causes actuator 128 to extend the thread rolling dies to threading engagement. Variable valve 210 controls the extension rate of actuator 128. Energization of solenoid 208B causes actuator 128 to retract the rolling dies to the upper position.

Pipe transfer carriage actuator 50 is connected to manifold 200 through a solenoid valve 216 and a variable valve 218 and exhausted to manifold 202 through valve 216. Energization of solenoid 216A extends actuator 50 to move the pipe transfer carriage from one stage to the next. Energization of solenoid 216B retracts actuator 50 to ratchet the traverse pawl 59 to a new position on the chain 24.

Female threading positioner actuator 174 is connected to manifold 200 through a solenoid valve 232 and a variable valve 234, and exhausted to manifold 202 through solenoid valve 232. Energization of solenoid 232A causes positioner 158 to extend, positioning the pipe into threading position. Energization of solenoid 232B retracts positioner 158 to a rest position as previously described.

Female threading head actuator 162 is supplied from manifold 200 through a solenoid valve 220 and a variable valve 222, and exhausted to manifold 202 through valve 220. Energization of solenoid 220 A extends actuator 162 to lower the rolling die into threading engagement. Energization of solenoid 220B retracts actuator 162 to raise the die to an upper position.

Male threading positioning head actuator 198 is supplied from manifold 200 through a solenoid valve 228 and a variable valve 230. Energization of solenoid 228A extends positioning head 180. Energization of solenoid 228B retracts the positioning head.

Male thread rolling actuator 184 is supplied from manifold 200 through a solenoid valve 232 and a variable valve 234, and exhausted to manifold 202 through valve 232. Energization of solenoid 232A extends actuator 184 and energization of solenoid 232B retracts the actuator.

In operation hydraulic pressure is continually maintained in manifold 200 and the various actuators extend or retract in response to periodic energization of the respective solenoids. In each case the actuator extension rate is determined by the variable valves.

The control system electrical circuitry is shown in FIGURES 12 and 13. The control system may be supplied from a conventional 110 or 220 volt A.C. power line through a starter switch 278. For clarity the circuit is shown with ground return though in actual practice return is conventionally provided by return conductors. All limit switches are shown in open or closed positions assumed when each stage is at the rest position occurring at the end of an operating cycle. All relay contacts are shown at positions assumed with the relays deenergized.

As shown in FIGURE 12, a cycle initiating relay 236 is connected from line to return through a normally open switch 60. Switch 60 is closed by forward travel of pipe transfer actuator 50 to a predetermined position, energizing relay 236 which closes contacts 236A, B, C, D, and E. Closing of contact 236A energizes a beading stage initiating relay 242 to begin a beading cycle for stage 14. Contact 236B energizes an upset ram relay 240 to initiate the cycle of pipe upsetting stage 12. Contact 236C energizes a femal threading initiating relay 244 to begin the threading cycle of threading stage 16. Closure of contact 236D energizes male threading initiating relay 246 to begin the threading cycle of male threading stage 18.

Closure of contact 236E energizes pipe transfer carriage relay 238 for return of actuator 50 to initial rest position.

Relay 238 includes normally open contacts 238A and 238B and normally closed contact 238C. Carriage transfer solenoid 216A is connected to line through contact 238C and connected to return through the rest position indicating switches later described. Carriage transfer return solenoid 216B is connected to return and connected to line through contact 238B. Relay 238 is connected to return and may be connected to line through momentary contact 236E or through contact 238A and carriage return switch 62.

When momentarily energized by contact 236E, relay 238 locks in through contact 238A and switch 62. Actuator 50 then begins to retract with solenoid 216B energized. Full retraction of actuator 50 opens switch 62, allowing relay 238 to drop out. Carriage transfer solenoid 216A is reconnected to line through contact 238C for subsequent energization upon closure of the rest position indicating switches.

Ram relay 240 has normally open contacts 240A and 240B and normally closed contact 240C. When closed, contact 240A locks in relay 240 from line to return through switch 88. Contact 240B connects solenoid 204A from line to return when closed. Contact 240C connects solenoid 204B from line to return through switch 91 when closed.

When initiating relay 236 is momentarily energized, ram relay 240 is energized through momentarily closed contact 236B, closing contacts 240A and B and opening contact 240C. Relay 240 then remains energized until switch 88 is opened by forward travel of ram 76. Solenoid 204A is energized by contact 240B to move ram 76 forward. When relay 240 is de-energized by opening of switch 88, contact 240C closes to energize solenoid 204B and return ram 76 to rest position. Return of ram 76 to rest position open switch 91. Solenoid 204B is de-energized by opening of switch 91, halting movement of ram 76. Stage 12 repeats this cycle when relay 240 is next energized by momentary closure of contact 236B. Switch 90 is also closed by return of ram 76 to rest position.

The immediate control circuit of beading stage 14, as connected from initiating relay 242, includes limit switches 147, 144, 140, 142, a rolling head descent stop relay 248, a beading cycle hold relay 254, a beading dwell time switch relay 260, a dwell time switch 266, and a positioner return lockout relay 272. Initiating relay 242 includes normally open contacts 242A and C and normally closed contact 242B. Stop relay 248 includes a normally open contact 248A and a normally closed contact 248B. Dwell time relay 260 includes a normally open contact 260A. Time switch 266 includes a normally open contact 266A' Time switch 266 is also separately provided with power from line. The positioner lockout relay 272 includes one normally closed contact 272A.

Relay 242 is connected to return and may be connected to line through momentray contact 236A or through contact 242A and switch 144A. Relay 272 is connected in parallel with actuator lowering solenoid 208A. Time switch 266 is connected to ground, separately connected to line for power supply, and connected for actuation through contact 260A. Time switch relay 260 may be connected to line through contact 254A and switches 142B and 144B, or through contact 248A and switch 144B, and may be connected to ground through switch 140B. Relay 254 is connected in parallel to relay 260. Relay 248 is connected to ground and may be connected to line through switch 142B and 144B or through contact 248A and switch 144B. Positioner extension solenoid 212A is connected to line and may be connected to ground through contact 242C. Positioner retraction solenoid 212B may be connected to line through contact 254C and may be connected to ground through contacts 242B, 272A, switch 147 and switch 140A. Actuator descent solenoid 208A, and parallel connected relay 272, may be connected to ground through contact 254B and connected to line through contact 248B, and switches 142B and 144B. Actuator raising solenoid 208B may be connected to ground through switch 140A and connected to line through time switch contact 266A.

In operation, assuming the beginning of a cycle, positioner actuator 112 is retracted, actuator 128 is raised and positioner plate 148 is retracted. At such time switch 147 is open, switch 145 is closed, switch 144A is closed, and switch 144B is open. Switch 142A is closed, switch 142B is open, switch 140A is closed, and switch 140B is open. All relays and solenoids are de-energized. Upon momentary closure of contact 236C, relay 242 is energized and locked in by contact 242A. Contact 242B opens, preventing energization of solenoid 212B. Closure of contact 242C energizes extension solenoid 212A, initiating forward travel of actuator 112. Actuator 112 moves a pipe into rolling position, pushing positioning plate 148 into contact with switch 144. As previously mentioned, the rod 154 pushes plate 148 if no pipe is present. Plate 148 opens switch 144A and closes switch 144B. Relay 242 thereon drops out, de-energizing solenoid 212A and closing the circuit for subsequent energization of solenoid 212B. It is noted that switch 147 is now closed when actuator 112 is extended. Closure of switch 144B energizes actuator descent solenoid 208A and positioner return solenoid lockout relay 272. Actuator 128 thereon begins to descend, opening switch 140A and closing switch 140B, connecting relays 260 and 254, and solenoid 208B to ground.

Descent of actuator 128 into rolling position opens switch 142A and closes switch 142B, de-energizing solenoid 208A and relay 272, and energizing relays 248, 254, and 260. Closure of contact 260A initiates the time sequence of time switch 266. Closure of contact 254A provides line voltage to lock in relays 254, 260 and 248. Contacts 254B and 248B open, de-energizing solenoid 208A and relay 272. Contact 248A closes, providing voltage to lock in relays 260, 254 and 248 only such time as switch 142A and 144B are closed, which will be as long as the dwell cycle continues.

A pre-determined time after contact 260A closes, time switch 266 closes contact 266A, energizing actuator raising solenoid 208B. Solenoid 208B remains energized until switch 140B is opened by upward travel of actuator 128.

As actuator 128 begins to rise, switch 142B opens and 142A closes, preparing lowering solenoid 208A for subsequent energization. Relays 260, 254 and 248 continue to receive line voltage through switch 144B and contact 248A as well as through contact 254A. As actuator 128 reaches an upper position, switch 140B is opened and switch 140A is closed, de-energizing relays 254 and 260, and actuator solenoid 208B, and concurrently energizing positioner return solenoid 208B. (Relay 248 remains energized through contact 248A and switch 144B.) Actuator 128 and pipe positioning plate 148 thereon begin to retract. As plate 148 moves away, switch 144A is closed, de-energizing relay 248. Contact 248B is thereby reclosed for subsequent energization of solenoid 208A. Switch 144A is closed, preparing relay 242 to be locked in by closure of contact 242A. As positioner actuator 112 reaches retracted position, switch 147 is opened, de-energizing solenoid 212B. Switch 146 is concurrently closed. As positioning plate 148 reaches fully retracted position, switch 145 is closed. All relays and solenoids are now de-energized and all switches are in initial rest position.

The previously described operation will be repeated upon subsequent momentary closure of contact 236C.

As shown in FIGURE 13, the immediate control circuit of female threading stage 16, as connected from initiating relay 244, includes limit switches 176, 172, 170, 168, a rolling head descent stop relay 250, a beading cycle hold relay 256, a beading dwell time switch relay 262, a dwell time switch 268, and a positioner return lockout relay 274. Initiating relay 244 includes normally open contacts 244A and C and normally closed contact 244B. Stop relay 250 includes a normally open contact 250A and a normally closed contact 250B. Dwell time relay 262 includes a normally open contact 262A. Time switch 268 includes a normally open contact 268A. Time switch 268 is also separately provided with power from line. The positioner lockout relay 274 includes one normally closed contact 274A.

Relay 244 is connected to return and may be connected to line through momentary contact 236C or through contact 244A and switch 172A. Relay 274 is connected in parallel with actuator lowering solenoid 220A. Time switch 268 is connected to ground, separately connected to line for power supply, and may be connected to line for actuation through contact 262A. Time switch relay 262 may be connected to line through contact 256A and switches 170B and 172B, or through contact 250A and switch 172B, and may be connected to ground through switch 168B. Relay 256 is connected in parallel to relay 262. Relay 250 is connected to ground and may be connected to line through switch 170B and 172B or through contact 250A and switch 172B. Positioner extension solenoid 224A is connected to line and may be connected to return through contact 244C. Positioner retraction solenoid 224B may be connected to line through contact 256C and may be connected to ground through contacts 244B, 274A, switch 175 and switch 168A. Actuator 162 descent solenoid 220A, and parallel connected relay 274, may be connected to ground through contact 256B and connected to line through contact 250B, and switches 170A and 172B. Actuator raising solenoid 220B may be connected to ground through switch 168A and connected to line through time switch contact 268A.

In operation, assuming the beginning of a cycle, actuator 174 is retracted, actuator 162 is raised and positioner plate 171 is retracted. At such time switch 176 is open, switch 173 is closed, switch 172A is closed, and switch 172B is open. Switch 170A is closed, switch 170B is open, switch 168A is closed, and switch 168B is open. All relays and solenoids are de-energized. Upon momentary closure of contact 236C, relay 244 is energized and locked in by contact 244A. Contact 244B opens, preventing energization of solenoid 224B. Closure of contact 244C by relay 244 energizes extension solenoid 224A, initiating forward travel of actuator 174. Female threading stage 16 thereon continues through its rolling cycle and returns to rest position in the same manner as previously described by beading stage 14. At rest position switches 173 and 175 are closed.

The immediate control circuit of male threading stage 18, as connected for initiating relay 246, includes limit switches 197, 194, 192, 190, a rolling head descent stop relay 252, a threading cycle hold relay 258, a beading dwell time switch relay 264, a dwell time switch 270, and a positioner return lockout relay 276. Initiating relay 246 includes normally open contacts 246A and C and normally closed contact 246B. Stop relay 252 includes a normally open contact 252A and a normally closed contact 252B. Dwell time relay 264 includes a normally open contact 264A. Time switch 270 includes a normally open contact 270A. Time switch 270 is also separately provided with power from line. The positioner lockout relay 276 includes one normally closed contact 276A.

Relay 246 is connected to return and may be connected to line through momentary contact 236C or through contact 246A and switch 194A. Relay 276 is connected in parallel with actuator lowering solenoid 232A. Time switch 270 is connected to ground, separately connected to line for power supply, and may be connected to line for actuation through contact 264A. Time switch relay 264 may be connected to line through contact 258B, and switches 192B and 194B, or through contact 252A and switch 194B and may be connected to ground through switch 190B. Relay 258 is connected in parallel to relay 264. Relay 252 is connected to ground and may be connected to line through switch 192B and 194B or through contact 252A and switch 194B. Positioner extension solenoid 228A is connected to line and may be connected to return through contact 246C. Positioner retraction solenoid 228B may be connected to line through contact 258C and may be connected to ground through contact 246B, 276A, switch 197 and switch 190A. Actuator descent solenoid 232A, and parallel connected relay 276, may be connected to ground through contact 258B and connected to line through contact 252B, and switches 192A and 194B. Actuator raising solenoid 232B may be connected to ground through switch 190A and connected to line through time switch contact 270A.

In operation, assuming the beginning of a cycle, actuator 198 is retracted, actuator 184 is raised and positioner plate 199 is retracted. At such time switch 197 is open, switch 195 is closed, switch 194A is closed, and switch 194B is open. Swith 192A is closed, switch 192B is open, switch 190A is closed, and switch 190B is open. All relays and solenoids are de-energized. Upon momentary energization of solenoid 236D, relay 246 is energized and locked in by contact 246A. Contact 246B opens, preventing energization of solenoid 228B. Closure of contact 246C energizes extension solenoid 228A initiating forward travel of actuator 198. Male threading stage 18 thereon continues through the rolling cycle and returns to rest position in the same manner as previously described for stages 14 and 16. At rest position switches 195 and 196 are closed.

It is noted that pipe transfer carriage actuator solenoid 216A is connected to line through normally closed contact 238C and connected to ground by switches 175, 195, 145, 173, 196, 146 and 90. All these switches must be closed for the pipe transfer carriage to be actuated. Closure of these switches is effected by return of ram 76, positioning actuator 112, positioning plate 148, positioning actuator 198, positioning plate 199, positioning actuator 174, and positioning plate 171 to rest position. It is seen that though each stage commences its operation upon energization of initiating relay 236, each stage must complete its respective cycle and return to rest position before the pipe can be transferred to a subsequent stage and a new cycle begun. As previously pointed out, pushrods are respectively provided between actuator 112 and positioning plate 148, actuator 174 and plate 171, and actuator 198 and plate 199 to enable each rolling stage to complete its cycle and return to rest position even though no pipe has been provided into the stage. Likewise ram 76 is provided with linkage to actuate switch 88 and complete the upsetting cycle without a pipe being in upset position.

Starter switch 278 may be opened during the cycle at some point other than at the rest position, then reclosed to start the machine. Actuator 76 will move back to rest position upon energization of solenoid 204B through normally closed contact 240C and the switch 91. Rolling head actuator 128 moves to lowered position upon energization of solenoids 208A through normally closed contacts 254B and 248B, and switches 142A and 144B. Actuators 162 and 184 move likewise. The cycle is then resumed as previously described. Upon completion of the rolling cycle the heads raise and the positioning head return solenoids are energized, returning the positioners and the positioning plates to rest position. The pipe transfer carriage actuating solenoid 216A is thereon energized, permitting a transfer of pipe from one stage to the next. Initiating relay 236 is then energized for a subsequent cycle.

In operation, referring to FIGURES 1, 2 and 3, the hopper 42 is loaded with quantities of pipe, the power unit 48 is started and the hydraulic pump is started. The control system starter switch 278 is then closed. The tongs 28 begin to move past successive stages of the machine and the pipe lifting carriage begins to deposit a pipe from the hopper 42 in each tongs 28 on each subsequent cycle of operation. The pipe is successively transferred by the tongs 28 to the upsetting stage 12, the beading stage 14, female threading stage 16 and the male threading stage 18. Each stage performs its respective operation. When initiated, each of the stages 12, 14, 16 and 18 will concurrently begin its respective operation. Each stage completes its operation and returns to rest position, closing a portion of the circuit for the pipe transfer actuation solenoid 216A. After all stages have performed their operation and returned to rest position, solenoid 216A is energized and the pipe transfer carriage moved a distance of one stage. The stages are again initiated for operation. This operation continues automatically.

It is therefore seen that the machine herein described will form complementary sections of a threaded coupling into ductile pipe in automatic fashion with attendant high volume output and minimum cost. Also, each stage of the machine completes its respective operation on the pipe before the machine will transfer the pipe to a subsequent stage. Further, the pipe is transported through the machine in a positive manner insuring correct operation upon each pipe by each stage.

It is to be pointed out that certain of the stages may be combined without departing from the spirit of the present invention. For example, beading stage 14 may be combined with female threading stage 16 by providing either of the heads moveable by a positioning actuator, so as to jointly serve as a positioning head. Combining female threading stage 16 with male threading stage 18 is also possible. It has been found, however, due to length changes and attendant axial shift of the pipe during the rolling operation, that smoother operation and superior threads are had when the pipe is supported in rolling position by the resiliently mounted positioning cones. The herein illustrated embodiment is therefore preferred.

It is thus seen that though a preferred embodiment of the invention is herein shown and described, other modifications may be made such as apparent to those skilled in the art without departing from the spirit of the invention as defined in the following appended claims.

That being claimed is:
1. Pipe forming apparatus comprising a frame, a plurality of pipe forming stages, each adapted to receive a pipe axially aligned within the stage, disposed on the frame in axial and transverse alignment, the stages including; a pipe upsetting stage having a pipe supporting head and a pipe upsetting head, means to engage the upsetting head and a pipe received into the upsetting stage into upsetting relation and disengage the pipe and upsetting head to a rest position, electrical control means to control the cycle of engagement, upsetting operation, and disengagement of the upsetting stage with the pipe and to prepare the upsetting stage for a successive upsetting cycle, and linkage means to cause completion of the upsetting cycle with no pipe received in the upsetting stage; a bead rolling stage having a beading head and a resilient positioning head, said beading head having a first beading die mounted on a shaft supported by a fixed bearing, a second beading die mounted on a shaft supported by a bearing in axially parallel moveable relation to the first beading die, and transmission means adapted to rotate the beading dies at like peripheral speeds, means to longitudinally position the wall of a pipe received in the bead rolling stage and the beading dies into a beading position and return the pipe and the beading dies to a rest position, means to bring the beading dies into bead forming engagement with the wall of the pipe and return the beading dies to a rest position, the electrical control means causing a cycle of positioning the pipe longitudinally, bringing the beading dies into bead forming engagement, holding the beading dies in bead forming engagement for a preselected period, returning the beading dies to rest position, and returning the pipe to rest position, and preparing the bead rolling stage for a successive beading cycle, and linkage means to cause completion of the beading cycle with no pipe received in the bead rolling stage; a female thread rolling stage having a threading head and a resilient positioning head, said threading head having a first threading die mounted on a shaft supported by a fixed bearing a second threading die mounted on a shaft supported by a bearing in axially parallel moveable relation to the first threading die, and transmission means adapted to rotate the threading dies at like peripheral speeds, means to longitudinally position the wall of a pipe received in the female thread rolling stage and the threading dies into a thread rolling position and return the pipe and the threading dies to a rest position, means to bring the threading dies into thread forming engagement with the wall of the pipe and return the threading dies to a rest position, the electrical control means causing a cycle of positioning the pipe longitudinally, bringing the threading dies into thread forming engagement, holding the threading dies in thread forming engagement for a pre-selected period, returning the threading dies to rest position, returning the pipe to rest position, and preparing the female thread rolling stage for a successive rolling cycle, and linkage means to cause completion of the threading cycle with no pipe received in the female thread rolling stage; a male thread rolling stage having a thread rolling and a resilient positioning head, said threading having a first male threading die mounted on a shaft supported by fixed bearing and a second male threading die mounted on a shaft supported by a bearing in axially parallel moveable relation to the first threading die, and transmission means adapted to rotate the threading dies at like peripheral speeds, means to longitudinally position the wall of a pipe received in the thread rolling stage into a threading position adjacent the bead forming by the beading stage and return the pipe and the threading dies to a rest position, means to bring the threading dies into thread forming engagement with the wall of the pipe and return the threading dies to a rest position, the electrical control means causing a cycle of positioning the pipe longitudinally, bringing the threading dies into threading engagement, holding the threading dies in threading engagement for a pre-selected period, returning the threading dies to rest position, longitudinally returning the pipe to a rest position, and preparing the male thread rolling stage for a successive rolling cycle, and linkage means to cause completion of the threading cycle with no pipe received in the male thread rolling stage; and a pipe transfer means having a moveable conveyor means tautly disposed on the frame in transverse relation to the axes of the pipe forming stages, pipe supporting tongs disposed in alignment to the axis of the forming stages, each of said tongs adapted to diverge at the outer ends of the frame into pipe receiving and ejecting relation and to converge between the ends into pipe supporting relation, means to move the conveyor means the distance from the axis of one forming stage to the next, the electrical control means causing the conveyor means to move each time the forming stages have all completed their forming cycles and retracted to rest position.

2. A pipe bead rolling apparatus including a pipe rolling head and an axial pipe positioning head disposed on a frame at spacing permitting support of a pipe between the heads, one of said heads being axially moveable with respect to the pipe, said rolling head including first and second complementary bead rolling dies disposed with axes parallel to the pipe and having means to be engaged and separated in parallel axial relation and rotated at like peripheral speeds, a first hydraulic means to move said bead rolling dies between engaged and separated positions, a resiliently mounted axial positioning member disposed in the positioning head being adapted to be deflected by said pipe in opposition to a force applied at the other end of said pipe by a displaceable rolling position indicating member, a linkage of less effective length than the pipe disposed between the moveable head and the rolling position indicating member to move the indicating member when the heads are brought together with no pipe supported between the heads, a second hydraulic means to move the heads together to pass the pipe over the first bead rolling die to an axial position determined by the rolling positioning member and to return the heads to an initial position, an electrical control means, including means to initially cause said second hydraulic means to move the heads together until the position member has been displaced to a position representative of a correct rolling position for the pipe, means to cause the first hydraulic means to urge the rolling dies toward engaged relation when the pipe is in rolling position, timing means to cause the first hydraulic means to hold the rolling dies in rolling position for a preselected time upon the dies reaching rolling relation, means to cause the first hydraulic means to move the rolling dies into separated position in response to the timing means, and means to cause the second hydraulic means to move the heads apart and permit withdrawal of the pipe and rolling position indicating member when the rolling dies reach the separated position.

3. A female thread rolling apparatus including a pipe rolling head and an axial pipe positioning head disposed on a frame at spacing permitting support of a pipe between the heads, one of said heads being axially moveable with respect to the pipe, said rolling head including first and second complementary female thread rolling dies disposed with axes parallel to the pipe and having means to be engaged and separated in parallel axial relation and rotated at like peripheral speeds, a first hydraulic means to move said female thread rolling dies between engaged and separated positions, a resiliently mounted axial positioning member disposed in the positioning head being adapted to be deflected by said pipe in opposition to a force applied at the other end of said pipe by a displaceable rolling position indicating member, a linkage of less effective length than the pipe disposed between the moveable head and the rolling position indicating member to move the indicating member when the heads are brought together with no pipe supported between the heads, a second hydraulic means to move the heads together to pass the pipe over the first female thread rolling die to an axial position determined by the rolling positioning member and to return the heads to an initial position, an electrical control means, including means to initially cause said second hydraulic means to move the heads together until the rolling position indicating member has been displaced to a position representative of a correct rolling position for the pipe, means to cause the first hydraulic means to urge the rolling dies toward engaged relation when the pipe is in rolling position, timing means to cause the first hydraulic means to hold the rolling dies in rolling position for a preselected time upon the dies reaching rolling relation, means to cause the first hydraulic means to move the rolling dies into separated position in response to the timing means, and means to cause the second hydraulic means to move the heads apart and permit withdrawal of the pipe and rolling position indicating member when the rolling dies reach the separated position.

4. A pipe male thread rolling apparatus including a pipe rolling head and an axial pipe positioning head disposed on a frame at spacing permitting support of a pipe between the heads, one of said heads being axially moveable with respect to the pipe, said rolling head including first and second complementary male thread rolling dies disposed with axes parallel to the pipe and having means to be engaged and separated in parallel axial relation and rotated at like peripheral speeds, a first hydraulic means to move said male thread rolling dies between engaged and separated positions, a resiliently mounted axial positioning member disposed in the positioning head being adapted to be deflected by said pipe in opposition to a force applied at the other end of said pipe by a displaceable rolling position indicating member, a linkage of less effective length than the pipe disposed between the moveable head and the rolling position indicating member to move the indicating member when the heads are brought together with no pipe supported between the heads, a second hydraulic means to move the heads together to pass the pipe over the first male thread rolling die to an axial position determined by the rolling positioning member and to return the heads to an initial position, an electrical control means, including means to initially cause said second hydraulic means to move the heads together until the rolling position indicating member has been displaced to a position representative of a correct rolling position for the pipe, means to cause the first hydraulic means to urge the rolling dies toward engaged relation when the pipe is in rolling position, timing means to cause the first hydraulic means to hold the rolling dies in rolling position for a preselected time upon the dies reaching rolling relation, means to cause the first hydraulic means to move the rolling dies into separated position in response to the timing means, and means to cause the second hydraulic means to move the heads apart and permit withdrawal of the pipe and rolling position indicating member when the rolling dies reach the separated position.

5. A pipe rolling apparatus including pipe rolling heads axially disposed on a frame at spacing permitting support of a pipe between the heads, one of said heads being axially moveable with respect to the pipe, said rolling heads each including first and second complementary rolling dies disposed with axes parallel to the pipe and having means to be engaged and separated in parallel axial relation and rotated at like peripheral speeds, a first hydraulic means to move said rolling dies between engaged and separated positions, a resiliently mounted axial positioning member being adapted to be deflected by said pipe in opposition to a force applied at the other end of said pipe by a displaceable rolling position indicating member, a linkage of less effective length than the pipe disposed between the moveable head and the rolling position indicating member to move the indicating member when the heads are brought together with no pipe supported between the heads, a second hydraulic means to move the heads together to pass the pipe over each first rolling die to an axial position determined by the rolling positioning member and to return the heads to an initial position, an electrical control means, including means to initially cause said second hydraulic means to move the heads together until the rolling position indicating member has been displaced to a position representative of a correct rolling position for the pipe, means to cause the first hydraulic means to urge the rolling dies toward engaged relation when the pipe is in rolling position, timing means to cause the first hydraulic means to hold the rolling dies in rolling position for a preselected time upon the dies reaching rolling relation, means to cause the first hydraulic means to move the rolling dies into separated position in response to the timing means, and means to cause the second hydraulic means to move the heads apart and permit withdrawal of the pipe and rolling position indicating member when the rolling dies reach the separated position.

6. A pipe rolling apparatus including a pipe rolling head and an axial pipe positioning head disposed on a frame at spacing permitting support of a pipe between the heads, one of said heads being axially moveable with respect to the pipe, said rolling head including first and second complementary rolling dies disposed with axes parallel to the pipe and having means to be engaged and separated in parallel axial relation and rotated at like peripheral speeds, a first hydraulic means to move said rolling dies between engaged and separated positions, a resiliently mounted axial positioning member disposed in the positioning head being adapted to be deflected by said pipe in opposition to a force applied at the other end of said pipe by a displaceable position indicating member, a linkage of less effective length than the pipe disposed between the moveable head and the position indicating member to move the indicating member when the heads are brought together with no pipe supported between the heads, a second hydraulic means to move the heads together to pass the pipe over the first die to an axial position determined by the rolling positioning member and to return the heads to an initial position, an electrical control means, including means to initially cause said second hydraulic means to move the heads together until the position indicating member has been displaced to a position representative of a correct rolling position for the pipe, means to cause the first hydraulic means to urge the rolling dies toward engaged relation when the pipe is in rolling position, timing means to cause the first hydraulic means to hold the rolling dies in rolling position for a preselected time upon the dies reaching rolling relation, means to cause the first hydraulic means to move the rolling dies into separated position in response to the timing means, and means to cause the second hydraulic means to move the heads apart and permit withdrawal of the pipe when the rolling dies reach the separated position.

7. The rolling apparatus of claim 6 wherein the electrical control system includes, a cycle initiating means responsive to movement of a pipe transfer means into completed transfer position, a transfer actuator return means responsive to the cycle initiating means to return the transfer actuator to rest position, a rolling stage means responsive to the cycle initiating means to move a pipe positioning means into rolling position, move rolling dies into forming position, hold the dies in forming position for a pre-selected period, return the dies to rest position, and return the positioning means to rest position, and means responsive to return of each stage to rest position to initiate the pipe transfer means into a successive pipe transfer movement.

8. A pipe forming apparatus including a frame, a plurality of pipe forming stages disposed on the frame with axes parallel and in transverse alignment, pipe transfer means to respectively support pipes in axial alignment with each successive forming stage in response to a pipe transfer actuation means, each of said stages having a forming head and a supporting head with one of the heads being axially moveable with respect to a pipe positioned between the heads, hydraulic actuation means including means to extend one of the heads into pipe forming position, means to limit the extent of the pipe forming operation performed by each forming head, means responsive to full retraction of the pipe from all of said forming heads to initiate actuation of said pipe transfer actuation means whereby another pipe is placed into successive pipe forming support within another forming stage, and means responsive to transfer of pipe to initiate actuation of said positioning and forming heads.

9. The forming apparatus of claim 8 including an electrical control system having a cycle initiating means responsive to movement of the transfer means into completed transfer position, a transfer actuator return means responsive to the cycle initiating means to return the transfer actuator to rest position, a plurality of forming stage control means responsive to the cycle initiating means to move a pipe positioning means into forming position, move forming dies into forming position, hold the dies in forming position for a preselected period, return the dies to rest position, and return the position means to rest position, and means responsive to return of each stage to rest position to initiate the pipe transfer means into a successive pipe transfer movement.

10. A pipe forming apparatus including a frame, a plurality of pipe forming stages disposed on the frame with axes parallel and in transverse alignment, pipe transfer means to respectively support pipes in axial alignment with each successive forming stage in response to a pipe transfer actuation means, each of said stages having a forming head and a supporting head with one of the heads being axially moveable with respect to a pipe positioned between the heads, hydraulic actuation means including means to extend one of the heads into pipe forming position, means to limit the extent of the pipe forming operation performed by each forming head, means to retract the pipe from each forming head, means responsive to full retraction of the pipe from all of said forming heads to initiate actuation of said pipe transfer actuation means whereby another pipe is placed into successive pipe forming support within another forming stage, and means responsive to transfer of pipe to initiate actuation of said positioning and forming heads.

11. The apparatus of claim 10 wherein the pipe transfer means includes the combination of transfer chains tautly disposed on sprockets between shafts supported on a frame in transverse relation to the axis of pipe forming stages, a multiplicity of pipe supporting tongs disposed on each transfer chain in aligned spacing, said spacing being equal to the axes spacing of the forming stages, said tongs being diverged into pipe receiving and ejecting relation when passing over the sprockets and being converged into pipe supporting relation where passing between the sprockets, pipe placing chains tautly disposed in inclined relation from sprockets between shafts supported on the frame in alignment with the transfer chains, pipe placing fingers disposed normal to each placing chain in aligned spacing, said spacing being at least as great as the diameter of the pipe, linkage means to sufficiently move said placing means in response to movement of said transfer means to place a pipe into the pipe supporting tongs successively diverged over the sprockets, and actuation means responsive to completion of the forming operation of each forming stage to successively move said transfer means a distance equal to the axes spacing of the forming stages in response to an electrical control means.

12. The apparatus of claim 10 including a pipe upsetting means comprising, a fixed supporting head disposed in spaced relation with a moveable upsetting head having an upsetting die adapted to enter and upset a pipe supported between the heads, hydraulic means to extend and retract the upsetting head, electrical control means to initiate extension of the upsetting head, means responsive to the depth of entry of the die into the pipe to initiate retraction of the upsetting head, means to strip the pipe from the upsetting die upon retraction of the upsetting head, electrical control means to halt retraction of the upsetting head, linkage means to initiate retraction of the upsetting head when no pipe is present for the die to enter, and means to indicate retraction of the upsetting head.

13. In a pipe transfer carriage means the combination of transfer chains tautly disposed on sprockets between shafts supported on a frame in a parallel relation to the axis of pipe forming stages, a multiplicity of pipe supporting tongs disposed on each transfer chain in aligned spacing, said spacing being equal to the axes spacing of the forming stages, said tongs being diverged into pipe receiving and ejecting relation when passing over the sprockets and being converged into pipe supporting relation when passing between the sprockets, pipe placing chains tautly disposed in inclined relation from sprockets between shafts supported on the frame in alignment with the transfer chains, pipe placing fingers disposed normal to each placing chain in aligned spacing, said spacing being at least as great as the diameter of the pipe, linkage means to sufficiently move said placing means in response to movement of said transfer means sufficient to place a pipe into the pipe supporting tongs successively diverged over the sprockets, and actuation means responsive to completion of the forming operation of each forming stage to successively move said transfer means a distance equal to the axes spacing of the forming stages in response to an electrical control means.

14. In a pipe upsetting means the combination of a fixed supporting head disposed in spaced relation with a moveable upsetting head having an upsetting die adapted to enter and upset a pipe supported between the heads, hydraulic means to extend and retract the upsetting head, electrical control means to initiate extension of the upsetting head, means responsive to the depth of entry of the die into the pipe to initiate retraction of the upsetting head, means to strip the pipe from the upsetting die upon retraction of the upsetting head, electrical control means to halt retraction of the upsetting head, linkage means to initiate retraction of the upsetting head when no pipe is present for the die to enter, and means to indicate retraction of the upsetting head.

15. Pipe forming apparatus comprising a frame, a plurality of pipe forming stages, each adapted to receive a pipe axially aligned within the stage, disposed on the frame in axial and transverse alignment, the stages including; a pipe upsetting stage having a pipe supporting head and a pipe upsetting head, means to engage the head and a pipe received into the upsetting stage into upsetting relation and disengage the pipe and head to a rest position, electrical control means to control the cycle of engagement, upsetting operation, and disengagement of the upsetting stage with the pipe and to prepare the upsetting stage for a successive upsetting cycle, linkage means to cause completion of the upsetting cycle with no pipe received in the upsetting stage; a plurality of rolling stages each having a rolling head and a resilient positioning head, said rolling head having a first rolling die mounted on a shaft supported by a fixed bearing, a second rolling die mounted on a shaft supported by a bearing in axially parallel moveable relation to the first beading die, and transmission means adapted to rotate the rolling dies at like peripheral speeds, means to longitudinally position the wall of a pipe received in the rolling stage and the rolling dies into a rolling position and return the pipe and the rolling dies to a rest position, means to bring the rolling dies into forming engagement with the wall of the pipe and return the rolling dies to a rest position, the electrical control means causing a cycle of positioning the pipe longitudinally, bringing the rolling dies into forming engagement, holding the rolling dies in forming engagement for a preselected period, returning the rolling dies to rest position, returning the pipe to rest position, and preparing the rolling stage for a successive rolling cycle, and linkage means to cause completion of the rolling cycle with no pipe received in the bead rolling stage; and a pipe transfer means having a moveable conveyor means tautly disposed on the frame in transverse relation to the axes of the pipe forming stages, pipe supporting tongus disposed in alignment to the axis of the forming stages, each of said tongs adapted to diverge at the outer ends of the frame into pipe receiving and ejecting relation and to converge between the ends into pipe supporting relation, means to move the conveyor means the distance from the axis of one forming stage to the next, the electrical control means causing the conveyor means to move each time the forming stages have all completed their forming cycles and retracted to rest position.

16. The apparatus of claim 15 wherein the electrical control system includes a cycle initiating means responsive to movement of the transfer means into completed transfer position, a transfer actuator return means responsive to the cycle initiating means to return the transfer actuator to rest position, and upset stage control means responsive to the cycle initiating means to move an upsetting ram to upsetting position and return the ram to rest position, a plurality of rolling stage means responsive to the cycle initiating means to move a pipe positioning means into rolling position, move the rolling dies into forming position, hold the dies in forming position for a preselected period, return the dies to rest position, and return the positioning means to rest position, and means responsive to return of each stage to rest position to initiate the pipe transfer means into a successive pipe transfer movement.

17. The apparatus of claim 15 wherein the pipe upsetting means including the combination of a fixed supporting head disposed in spaced relation with a moveable upsetting head having an upsetting die adapted to enter and upset a pipe supported between the heads, hydraulic means to extend and retract the upsetting head, electrical control means to initiate extension of the upsetting head, means responsive to the depth of entry of the die into the pipe to initiate retraction of the upsetting head, means to strip the pipe from the upsetting die upon retraction of the upsetting head, electrical control means to halt retraction of the upsetting head, linkage means to initiate retraction of the upsetting head when no pipe is present for the die to enter, and means to indicate retraction of the upsetting head.

18. The apparatus of claim 17 wherein the electrical control system includes a cycle initiating means responsive to movement of the transfer means into completed transfer position, a transfer actuator return means responsive to the cycle initiating means to return the transfer actuator to rest position, and upset stage control means responsive to the cycle initiating means to move an upsetting ram to upsetting position and return the ram to rest position, a plurality of rolling stage means responsive to the cycle initiating means to move a pipe positioning means into rolling position, move the rolling dies into forming position, hold the dies in forming position for a preselected period, return the dies to rest position, and return the positioning means to rest position, and means responsive to return of each stage to rest position to initiate the pipe transfer means into a successive pipe transfer movement.

19. Pipe forming apparatus comprising a frame, a plurality of pipe forming stages, each adapted to receive a pipe axially aligned within the stage, disposed on the frame in axial and transverse alignment, the stages including: a pipe upsetting stage having a pipe supporting head and a pipe upsetting head, means to engage the head and a pipe received into the upsetting stage into upsetting relation and disengage the pipe and head to a rest position, electrical control means to control the cycle of engagement, upsetting operation, and disengagement of the upsetting stage with the pipe and to prepare the upsetting stage for a successive upsetting cycle, and linkage means to cause completion of the upsetting cycle with no pipe received in the upsetting stage; a plurality of rolling stages each having rolling heads and a resilient positioning means, said rolling heads each having a first rolling die mounted on a shaft supported by a fixed bearing, a second rolling die mounted on a shaft supported by a bearing in axially parallel moveable relation to the first rolling die, and transmission means adapted to rotate the rolling dies at like peripheral speeds, means to longitudinally position the wall of a pipe received in the rolling stage and the rolling dies into rolling position and return the pipe and the rolling dies to a rest position, means to bring the rolling dies into forming engagement with the wall of the pipe and return the rolling dies to a rest position, the electrical control means causing a cycle of positioning the pipe longitudinally, bringing the rolling dies into forming engagement, holding the rolling dies in forming engagement for a preselected period, returning the rolling dies to rest position, returning the pipe to rest position, and preparing the rolling stage for a successive rolling cycle, and linkage means to cause completion of the rolling cycle with no pipe received in a rolling stage; and a pipe transfer means having a moveable conveyor means tautly disposed on the frame in transverse relation to the axes of the pipe forming stages, pipe supporting tongs disposed in alignment to the axis of the forming stages, each of said tongs adapted to diverge at the outer ends of the frame into pipe receiving and ejecting relation and to converge between the ends into pipe supporting relation, means to move the conveyor means the distance from the axis of one forming stage to the next, the electrical control means causing the conveyor means to move each time the forming stages have all completed their forming cycles and retracted to rest position.

20. Pipe forming apparatus comprising a frame, a plurality of pipe forming stages each adapted to receive a pipe axially aligned within the stage disposed on the frame in axial and transverse alignment, the stages including: a pipe upsetting stage having a pipe supporting head and a pipe upsetting head, means to engage the head and a pipe received into the upsetting stage into upsetting relation and disengage the pipe and head to a rest position, electrical control means to control the cycle of engagement, upsetting operation, and disengagement of the upsetting stage with the pipe and to prepare the upsetting stage for a successive upsetting cycle, and linkage means to cause completion of the upsetting cycle with no pipe received in the upsetting stage; a plurality of rolling stages including a bead rolling stage, a female thread rolling stage, and a male thread rolling stage, each stage having rolling heads and a resilient positioning means, said rolling heads each having a first rolling die mounted on a shaft supported by a fixed bearing, a second rolling die mounted on a shaft supported by a bearing in axially parallel moveable relation to the first rolling die, and transmission means adapted to rotate the rolling dies with the rolling dies at the male threading stage having the fastest peripheral speed, means to longitudinally position the wall of a pipe received in the rolling stage and the rolling dies into rolling position and return the pipe and the rolling dies to a rest position, means to bring the rolling dies into forming engagement with the wall of the pipe and return the rolling dies to a rest position, the electrical control means causing a cycle of positioning the pipe longitudinally, bringing the rolling dies into bead forming engagement, holding the rolling dies in forming engagement for a preselected period, returning the rolling dies to rest position, returning the pipe to rest position, and preparing the rolling stage for a successive rolling cycle, and linkage means to cause completion of the beading cycle with no pipe received in the bead rolling stage; and a pipe transfer means having a movable conveyor means tautly disposed on the frame in transverse relation to the axes of the pipe forming stages, pipe supporting tongs disposed in alignment to the axes of the forming stages, each of said tongs adapted to diverge at the outer ends of the frame into pipe receiving and ejecting relation and to converge between the ends into the pipe supporting relation, means to move the conveyor means the distance from the axis of one forming stage to the next, the electrical control means causing the conveyor means to move each time the forming stages have all completed their forming cycles and retracted to rest position.

21. Pipe forming apparatus as defined by claim 20 wherein the rolling dies at the female thread rolling stage and the rolling dies at the male thread rolling stage provide opposite direction of rotation of the pipe during thread rolling whereby the axial movement of the pipe at the female thread rolling stage is in an opposite direction to the axial movement of the pipe at the male thread rolling stage.

22. In a pipe upsetting means the combination of a supporting head disposed in spaced relation with a movable upsetting head having an upsetting die adapted to enter and upset a pipe supported between the heads, fluid operated means to extend and retract the upsetting head, means responsive to the movement of the die into the pipe to initiate retraction of the upsetting head, and linkage means to initiate retraction of the upsetting head when no pipe is present for the die to enter.

23. Apparatus for successively rolling threads on first one end and then the other end of a pipe which comprises a first threading stage and a second threading stage disposed with axes parallel and in transverse alignment, means for transferring pipe from said first threading stage to said second threading stage, each said stage comprising a threading head and an axially movable positioning head spaced apart to permit supporting a pipe between the heads, each said threading head including first and second complementary thread rolling dies, one of which is adapted to engage the inside of the pipe and the other of which is adapted to engage the outside of the pipe, and means for driving the dies in one threading stage at a different speed from the speed of the dies in the other threading stage.

References Cited in the file of this patent

UNITED STATES PATENTS

| | | | |
|---|---|---|---|
| Re. 24,441 | Parker | Mar. 4, | 1958 |
| 633,280 | Blakeslee | Sept. 19, | 1899 |
| 661,197 | Sydney | Nov. 6, | 1900 |
| 734,063 | Hauck | July 21, | 1903 |
| 1,010,617 | Gray | Dec. 5, | 1911 |
| 2,027,406 | Spatta | Jan. 14, | 1936 |
| 2,169,166 | Rober | Aug. 8, | 1939 |
| 2,470,923 | Eisler | May 24, | 1949 |
| 2,506,657 | Webster | May 9, | 1950 |
| 2,655,670 | Eyler | Oct. 20, | 1953 |
| 2,669,139 | Finch | Feb. 16, | 1954 |
| 2,736,238 | Moncrieff | Feb. 28, | 1956 |
| 2,774,460 | Spoonhour | Dec. 18, | 1956 |

FOREIGN PATENTS

| | | | |
|---|---|---|---|
| 758,302 | France | Oct. 23, | 1933 |